(12) United States Patent
Imaizumi et al.

(10) Patent No.: US 12,427,710 B2
(45) Date of Patent: Sep. 30, 2025

(54) DEVICE FOR PRODUCTION OF THIN PLATE-LIKE LAMINATE HAVING FILM-LIKE RESIN LAYER

(71) Applicant: FUTAMURA KAGAKU KABUSHIKI KAISHA, Nagoya (JP)

(72) Inventors: Takuzo Imaizumi, Aichi (JP); Naomi Goto, Aichi (JP); Naoki Shiba, Aichi (JP)

(73) Assignee: FUTAMURA KAGAKU KABUSHIKI KAISHA, Nagoya (JP)

( * ) Notice: Subject to any disclaimer, the term of this patent is extended or adjusted under 35 U.S.C. 154(b) by 609 days.

(21) Appl. No.: 17/440,601

(22) PCT Filed: Mar. 18, 2020

(86) PCT No.: PCT/JP2020/011962
§ 371 (c)(1),
(2) Date: Sep. 17, 2021

(87) PCT Pub. No.: WO2020/196151
PCT Pub. Date: Oct. 1, 2020

(65) Prior Publication Data
US 2022/0161483 A1    May 26, 2022

(30) Foreign Application Priority Data

Mar. 25, 2019   (JP) .................................. 2019-056971
Mar. 13, 2020   (JP) .................................. 2020-044239

(51) Int. Cl.
*B29C 59/02*    (2006.01)
*B29C 43/06*    (2006.01)
(Continued)

(52) U.S. Cl.
CPC ............ *B29C 59/026* (2013.01); *B29C 43/06* (2013.01); *B29C 43/3697* (2013.01);
(Continued)

(58) Field of Classification Search
CPC ................ B29C 43/3697; B29C 59/04; B29C 2043/046; B29C 43/06; B29C 43/18;
(Continued)

(56) References Cited

U.S. PATENT DOCUMENTS 4,490,321 A * 12/1984 Klinkau .................. B29C 43/52
                                                              210/231
4,948,355 A *  8/1990 Knoll ....................... B29C 43/04
                                                              425/384
(Continued)

FOREIGN PATENT DOCUMENTS

| | | |
|---|---|---|
| JP | 10-282315 A | 10/1998 |
| JP | 2009-158731 A | 7/2009 |
| JP | 2018-200931 A | 12/2018 |
| WO | WO-0226455 A2 * | 4/2002 ............... B27N 3/00 |

OTHER PUBLICATIONS

International Search Report for the Application No. PCT/JP2020/011962 mailed Jun. 9, 2020.

*Primary Examiner* — Joseph S Del Sole
*Assistant Examiner* — Jennifer L Groux
(74) *Attorney, Agent, or Firm* — Muncy, Geissler, Olds & Lowe, P.C.

(57) ABSTRACT

A device for the production of a thin plate laminate includes a setting device for creating a mold retention structure in which the molds are arranged on both surface sides of the workpiece, a heating device for heating the molds, a compression roller device in which the mold retention structure is introduced between two compression rollers and which compresses outer surfaces of the molds by rotating the compression rollers to integrally thermocompression-bond film resin composition and the substrate to form a thin plate laminate having the film resin layer, and an extraction device for extracting the mold retention structure after compression from the molds.

15 Claims, 16 Drawing Sheets

(51) Int. Cl.
   *B29C 43/36*    (2006.01)
   *B29C 59/00*    (2006.01)
   *B29C 59/04*    (2006.01)
   *B32B 37/00*    (2006.01)
   *B32B 37/10*    (2006.01)

(52) U.S. Cl.
   CPC ............ *B29C 59/002* (2013.01); *B29C 59/04* (2013.01); *B32B 37/0053* (2013.01); *B32B 37/10* (2013.01)

(58) Field of Classification Search
   CPC . B29C 33/34; B29C 33/36; B29C 2043/3613; B29C 43/361; B29C 43/04; B29C 59/046; B32B 37/0053; B32B 37/06; B32B 37/10; B32B 17/10862; G03F 7/0002
   See application file for complete search history.

(56) References Cited

U.S. PATENT DOCUMENTS

| | | | |
|---|---|---|---|
| 6,592,785 B1* | 7/2003 | Mukasa | C03B 11/16 65/102 |
| 9,711,176 B2* | 7/2017 | Kitahara | B32B 27/308 |
| 11,745,488 B2* | 9/2023 | Imaizumi | B32B 3/30 156/219 |
| 2008/0230932 A1* | 9/2008 | Tanaka | C03B 11/08 425/338 |
| 2008/0265447 A1* | 10/2008 | Bae | G03F 9/7053 264/319 |
| 2009/0166914 A1 | 7/2009 | Ogino et al. | |
| 2010/0303947 A1* | 12/2010 | Mori | B29C 43/021 425/385 |
| 2015/0197039 A1* | 7/2015 | Matsuzuki | C03B 11/125 264/297.7 |

\* cited by examiner (a)

(b)

(a)

(b)

DEVICE FOR PRODUCTION OF THIN PLATE-LIKE LAMINATE HAVING FILM-LIKE RESIN LAYER

FIELD

The present invention relates to a device for the production of a thin plate-like laminate having a film-like resin layer.

BACKGROUND

Resin films are used in an extremely wide range of applications such as decorative materials, packaging materials, adhesive films, and optical members because they have excellent mechanical properties such as moldability and corrosion resistance, are lightweight, easy to process, and they can easily be fused with other resin materials.

For example, when producing a thin plate-like laminate such as a semiconductor substrate, a film-like resin layer is laminated on the surface of a substrate. In such a thin plate-like laminate, a predetermined concave/convex shape is transferred and etched onto the resin layer on the thin plate-like substrate, whereby a concave/convex structure corresponding to the concave/convex shape of the resin layer is formed on the surface of the substrate (refer to, for example, Patent Literature 1). In the transfer onto the resin layer of the thin plate-like laminate described above, as illustrated in, for example, FIG. 16, a mold 210 having a mold surface 211 having a concave/convex surface shape is arranged on the resin layer 222 side with respect to a workpiece 220 having a substrate 221 on which a resin layer 222 is laminated and the workpiece is pressed via the mold 210, whereby a concave/convex shape 223 is formed on the resin layer 222. Note that in the drawing, reference sign 200 represents compression means such as a pressing device, and reference sign 201 represents a machine base of the compression means 200.

Since such a concave/convex structure on the surface of the substrate exhibits a predetermined functionality, high precision is required. However, since the film-like resin layer of the thin plate-like laminate is extremely thin, it is difficult to stably form a concave/convex shape on the resin layer with high accuracy. In particular, when the projections and concavities on the surface of the substrate are fine, the quality of the processing accuracy has a significant influence on the functionality, and thus, it is necessary that processing accuracy be improved.

CITATION LIST

Patent Literature

[Patent Literature 1] Japanese Unexamined Patent Publication (Kokai) No. 2018-200931

SUMMARY

Technical Problem

The present invention is proposed in light of the above circumstances, and provides a device for the production of a thin plate-like laminate having a film-like resin layer in which a concave/convex shape can stably be formed with high accuracy on the film-like resin layer laminated on a thin plate-like substrate.

Solution to Problem

In other words, the invention according to claim 1 provides a device for the production of a thin plate-like laminate having a film-like resin layer, the device being for interposing a workpiece in which a film-like resin composition is laminated on at least one surface of a thin plate-like substrate with molds to obtain a thin plate-like laminate in which a film-like resin layer is integrally formed on the substrate, the device comprising a setting device for creating a mold retention structure in which the molds are arranged on both surface sides of the workpiece, a heating device for heating the molds to a thermal deformation temperature of the film-like resin composition, a compression roller device in which the mold retention structure, after heating of the molds, is introduced between two compression rollers and which compresses outer surfaces of the molds by rotating the compression rollers to integrally thermocompression-bond the film-like resin composition and the substrate to form a thin plate-like laminate having the film-like resin layer, and an extraction device for extracting the mold retention structure after compression from the molds.

The invention according to claim 2 provides the device for the production of a thin plate-like laminate having a film-like resin layer according to claim 1, wherein the heating device heats the molds, which are holding the workpiece.

The invention according to claim 3 provides the device for the production of a thin plate-like laminate having a film-like resin layer according to claim 1, wherein the heating device heats the molds, which are not holding the workpiece.

The invention according to claim 4 provides the device for the production of a thin plate-like laminate having a film-like resin layer according to any one of claims 1 to 3, further comprising a cooling device which cools the molds compressed by the compression roller device.

The invention according to claim 5 provides the device for the production of a thin plate-like laminate having a film-like resin layer according to any one of claims 1 to 4, wherein the setting device and the extraction device are shared.

The invention according to claim 6 provides the device for the production of a thin plate-like laminate having a film-like resin layer according to any one of claims 1 to 5, wherein the substrate is a thin plate-like material having a thickness of 1 mm or less and the thickness of the film-like resin composition is 500 μm or less.

The invention according to claim 7 provides the device for the production of a thin plate-like laminate having a film-like resin layer according to any one of claims 1 to 6, wherein the film-like resin compositions are laminated on both surfaces of the substrate.

The invention according to claim 8 provides the device for the production of a thin plate-like laminate having a film-like resin layer according to any one of claims 1 to 7, wherein a plurality of the workpieces are arranged, and the molds are arranged on both surface sides of each of the workpieces.

The invention according to claim 9 provides the device for the production of a thin plate-like laminate having a film-like resin layer according to any one of claims 1 to 8, wherein the film-like resin composition is a decorative, adhesive, or conductive functional resin composition.

The invention according to claim 10 provides the device for the production of a thin plate-like laminate having a film-like resin layer according to any one of claims 1 to 9, wherein mold surfaces of the molds have fine concave/convex surface shapes.

ADVANTAGEOUS EFFECTS OF INVENTION

According to the device for the production of a thin plate-like laminate having a film-like resin layer according to the invention of claim 1, since there is provided a device for interposing a workpiece in which a film-like resin composition is laminated on at least one surface of a thin plate-like substrate with molds to obtain a thin plate-like laminate in which a film-like resin layer is integrally formed on the substrate, the device comprising a setting device for creating a mold retention structure in which the molds are arranged on both surface sides of the workpiece, a heating device for heating the molds to a thermal deformation temperature of the film-like resin composition, a compression roller device in which the mold retention structure, after heating of the molds, is introduced between two compression rollers and which compresses outer surfaces of the molds by rotating the compression rollers to integrally thermocompression-bond the film-like resin composition and the substrate to form a thin plate-like laminate having the film-like resin layer, and an extraction device for extracting the compressed mold retention structure from the molds, pressure is applied uniformly to the molds to suppress the occurrence of pressure unevenness, whereby a concave/convex shape can be stably formed with high accuracy on the film-like resin layer laminated on the thin plate-like substrate.

According to the device for the production of a thin plate-like laminate having a film-like resin layer of the invention of claim 2, in the invention of claim 1, the heating device heats the molds, which are holding the workpiece, which is economically advantageous because excessive heating of the molds is not necessary.

According to the device for the production of a thin plate-like laminate having a film-like resin layer according to the invention of claim 3, in the invention of claim 1, since the heating device heats the molds which are not holding the workpiece, it is possible to heat to a high temperature in a short time, whereby operation time can be shortened, and oxidation of the film-like resin composition of the workpiece due to heating is suppressed, which enables high-quality molding.

According to the device for the production of a thin plate-like laminate having a film-like resin layer according to the invention of claim 4, in the invention of claims 1 to 3, since there is provided a cooling device which cools the molds compressed by the compression roller device, the shape of the concave/convex surface of the thin plate-like laminate can be stabilized.

According to the device for the production of a thin plate-like laminate having a film-like resin layer according to claim 5, in the invention of claims 1 to 4, since the setting device and the extraction device are devices which are shared, the space needed for the production device can be reduced, and equipment to be used can be omitted to reduce the cost.

According to the device for the production of a thin plate-like laminate having a film-like resin layer according to claim 6, in the invention of claims 1 to 5, since the substrate is a thin plate-like material having a thickness of 1 mm or less and the thickness of the film-like resin composition is 500 μm or less, lightweight and precise products can be obtained.

According to the device for the production of a thin plate-like laminate having a film-like resin layer according to claim 7, in the invention of claims 1 to 6, since the film-like resin compositions are laminated on both surfaces of the substrate, products with various functionalities can be easily produced.

According to the device for the production of a thin plate-like laminate having a film-like resin layer according to claim 8, in the invention of claims 1 to 7, since a plurality of the workpieces are arranged, and the molds are arranged on both surface sides of each of the workpieces, a plurality of thin plate-like laminates of the same type or different types can be molded at the same time, whereby work efficiency and production efficiency can be improved.

According to the device for the production of a thin plate-like laminate having a film-like resin layer according to claim 9, in the invention of claims 1 to 8, since the film-like resin composition is a decorative, adhesive, or conductive functional resin composition, products which can be used in a very wide range of applications can be provided.

According to the device for the production of a thin plate-like laminate having a film-like resin layer according to claim 10, in the invention of claims 1 to 9, since mold surfaces of the molds have fine concave/convex surface shapes, a fine concave/convex shape can stably be formed with high accuracy on the film-like resin layer.

DESCRIPTION OF EMBODIMENTS

Figure 1:
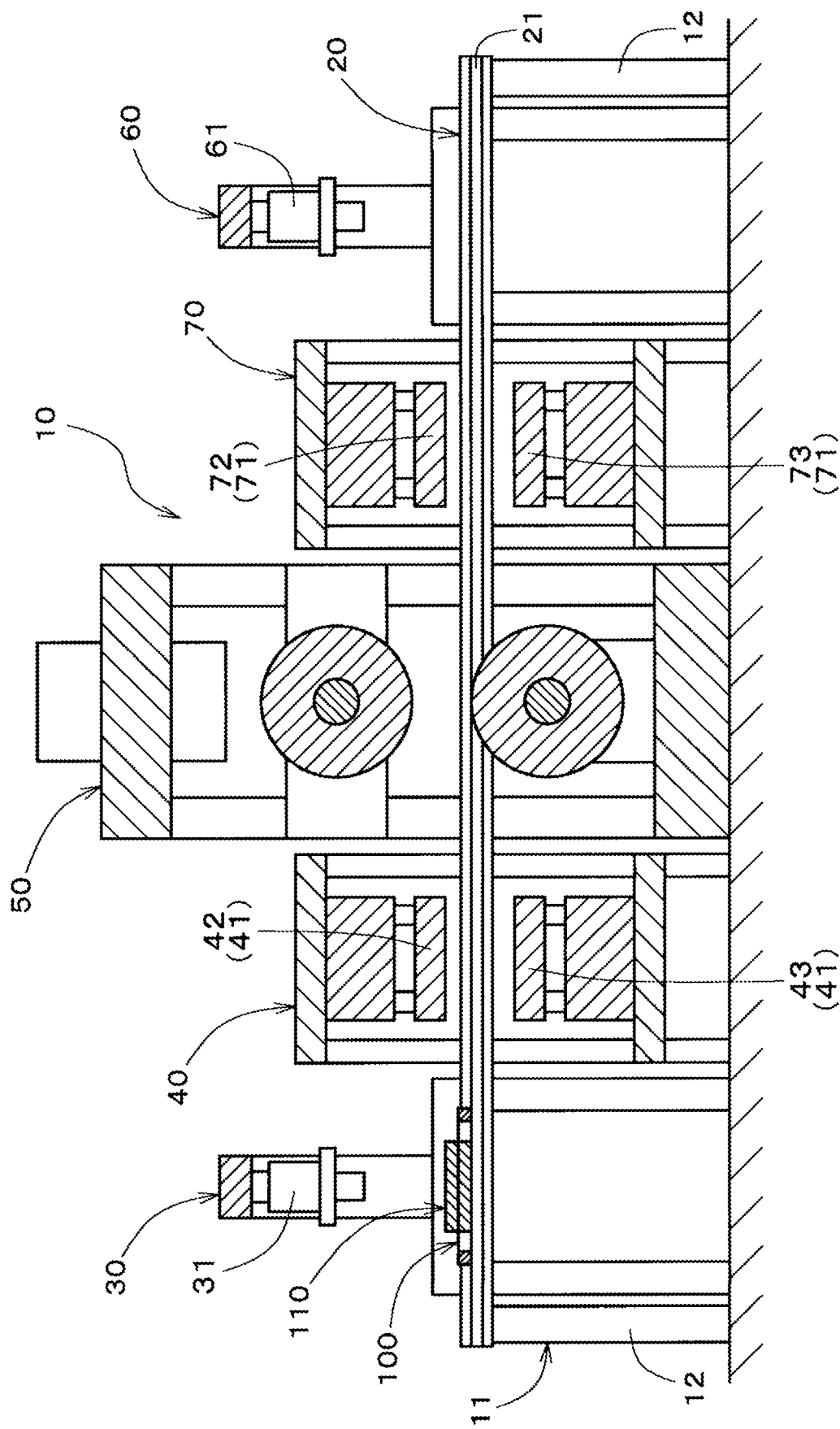
FIG. 1 is a schematic diagram of the entirety of a device for the production of a thin plate-like laminate according to an embodiment of the present invention.

The device 10 for the production of a thin plate-like laminate according to an embodiment of the present invention shown in FIG. 1 is a device for interposing a workpiece (85) in which a film-like resin composition (84) is laminated on at least one surface of a thin plate-like substrate (81) with molds (110) to obtain a thin plate-like laminate (80) in which a film-like resin layer (82) is integrally formed on the substrate (81). The production device 10 comprises a setting part 30 having a setting device 31, a heating part 40 having a heating device 41, a pressurization part 50 having a compression roller device 51, and an extraction part 60 having an extraction device 61.

The illustrated production device 10 comprises a machine base 11 which connects the setting part 30, the heating part 40, the pressurization part 50, and the extraction part 60 by means of a rail part 20. The rail part 20 has a rail body 21 composed of a pair of rod-shaped members located between the setting part 30, the heating part 40, the pressurization part 50, and the extraction part 60, and connects the setting part 30, the heating part 40, the pressurization part 50, and the extraction part 60 in series. A mold retention structure 100 is installed on the rail body 21 so as to be capable of moving between the setting part 30, the heating part 40, the pressurization part 50, and the extraction part 60. Reference sign 12 in the drawing indicates legs of the machine base 11 which support the rail part 20.

Figure 2:
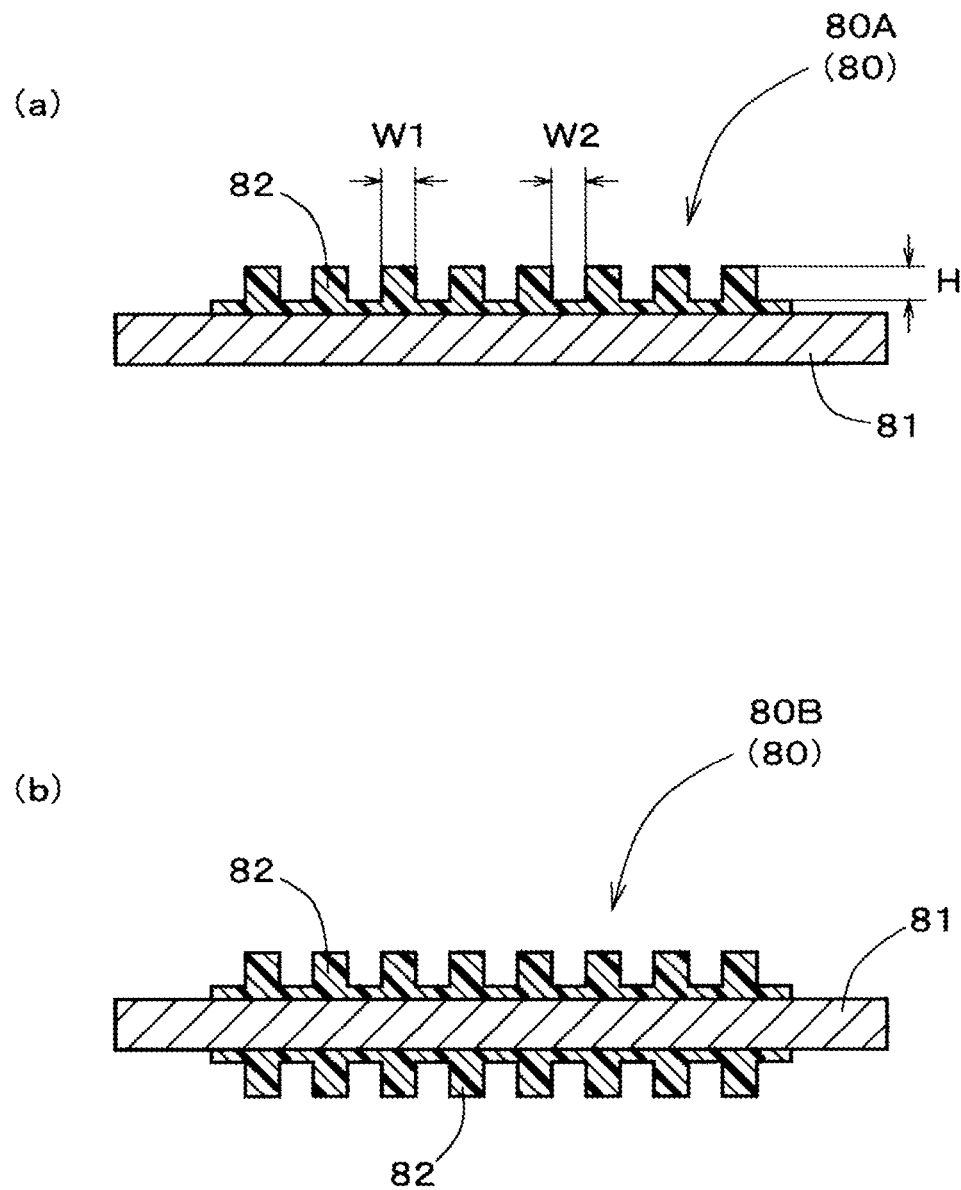
FIG. 2 shows schematic cross-sectional views of thin plate-like laminates.

The thin plate-like laminate 80, as shown in FIG. 2, is a laminate in which a film-like resin layer 82 is laminated on at least one surface of a thin plate-like substrate 81, and the film-like resin layer 82 has a predetermined concave/convex shape 83. FIG. 2(a) shows a thin plate-like laminate 80A in which the film-like resin layer 82 is formed on one surface of the thin plate-like substrate 81, and FIG. 2(b) shows a thin plate-like laminate 80B in which the film-like rein layer 82 is formed on both surface sides of the thin plate-like substrate 81. In the thin plate-like laminate 80, by forming the predetermined concave/convex shape 83 on the surface thereof, various products such as semiconductor substrates, optical members such as optical lenses and optical films, separators for fuel cells, wearable electrodes, sensors, electrostatic adsorbents, resistance heating elements, electromagnetic wave shield materials, connectors, solar cell members, and separators for water electrolysis devices can be produced.

Figure 3:
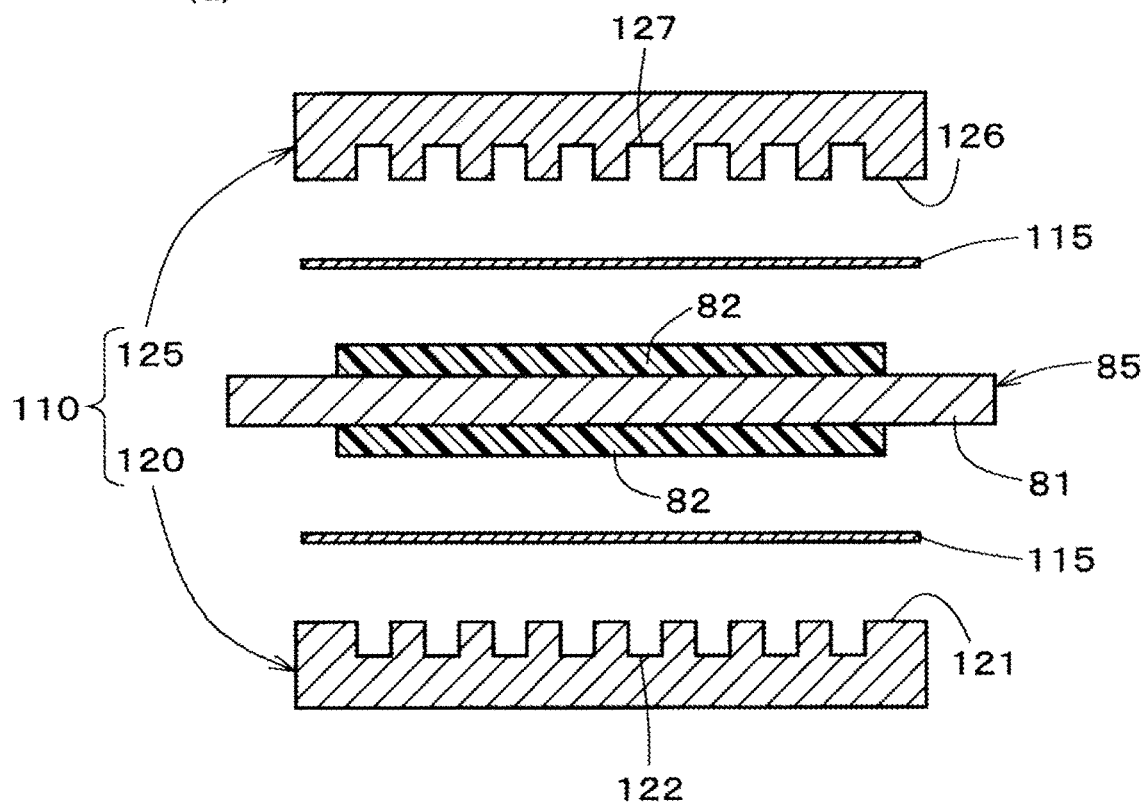
FIG. 3 shows schematic cross-sectional views showing molding states of a workpiece.
Figure 3:
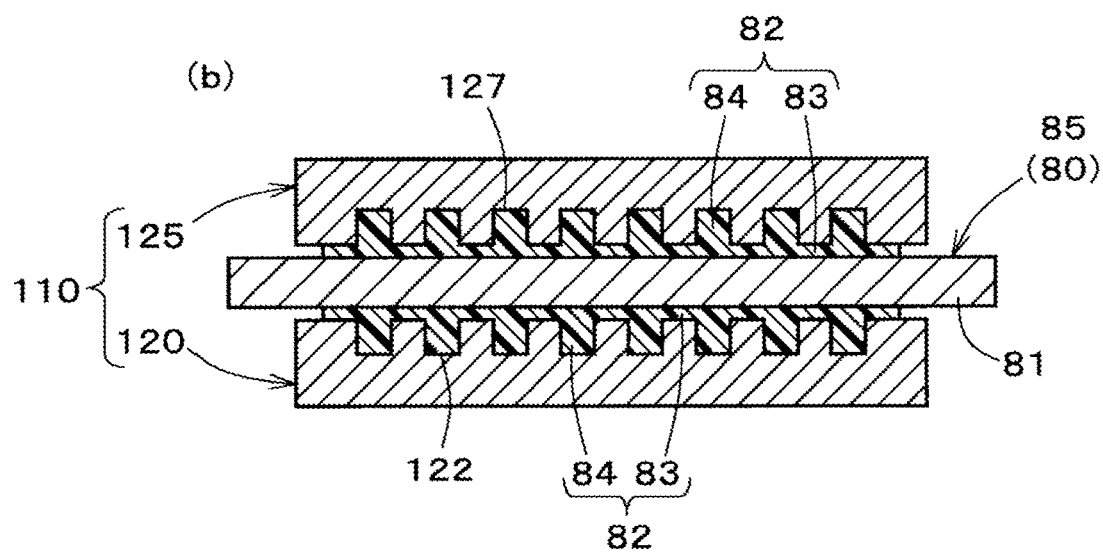

The thin plate-like laminate 80, as shown in FIG. 3, can be obtained by forming the predetermined concave/convex shape 83 on a surface of a film-like resin composition 84 laminated on at least one surface of the thin plate-like substrate 81 of a workpiece 85 by a predetermined mold 110. In the thin plate-like laminate 80, though the shapes, thickness, etc., of the thin plate-like substrate 81 and film-like resin composition 84 are determined in accordance with the type of the desired products, for example, the thickness of the thin plate-like substrate 81 is 1 mm or less and the thickness of the film-like resin composition 84 is 500 μm or less, and more preferably, the thickness of the thin plate-like substrate 81 is 100 μm or less and the thickness of the film-like resin composition 84 is 50 to 150 μm. By setting the thicknesses of the thin plate-like substrate 81 and the film-like resin composition 84 as described above, lightweight and precise products can be obtained. In particular, when imparting a conductive function, which is described later, suitable conductivity can be provided.

The thin plate-like substrate 81 is a thin plate member composed of a material having corrosion resistance and heat resistance such as titanium, aluminum, and stainless steel (SUS).

The film-like resin composition 84 is laminated on one or both sides of the thin plate-like substrate 81, a predetermined concave/convex shape 83 is formed on the surface thereof, and is constituted as a film-like resin layer 82. Though the shape, size, etc., of the concave/convex shape 83 of the film-like resin layer 82 are determined in accordance with the application of the thin plate-like laminate 80 or the like, fine protrusions and concavities may be formed thereon. Regarding the fine protrusions and concavities, for example, a groove depth (H) thereof is 50 to 300 μm, a groove upper surface width (W1) thereof is 50 to 400 μm, and a groove inner surface width (W2) thereof is 100 to 400 μm.

Examples of the material constituting the film-like resin composition 84 include ethylene homopolymers, propylene homopolymers (homopolypropylene), random copolymers of ethylene and one or two or more α-olefins such as propylene, 1-butene, 1-pentene, 1-hexene, 4-methyl-1-pentene, and block copolymers of the above components. Additionally, the examples of the material may include polyolefm resins such as the mixtures of the polymers described above, polyolefin elastomers, acid-modified polypropylene, acid-modified polyethylene, ethylene/vinyl alcohol copolymer resins, and hydrocarbon resins. Additional examples include fluororesins and fluororubbers. Furthermore, at least one type of conductive material such as a carbon material or a conductive ceramic may be added to these materials. Examples of the carbon material include carbon nanotubes, granular graphite, and carbon fibers.

The film-like resin composition 84 is constituted as a decorative, adhesive, or conductive functional resin composition depending on the desired product to be produced. Decorative functional resin compositions are resin layers in which fine protrusions and concavities are subjected to surface treatment such as wrinkling (wrinkle pattern), embossing (embossed pattern), or reflective processing (matte tone). Adhesive functional resin compositions are resin layers having high adhesive strength composed of a polyethylene resin. Conductive functional resin compositions are energizable resin layers in which a carbon material is added to the resin material. By providing these functional resin compositions, the thin plate-like laminate 80 can be used in an extremely wide range of applications.

The mold 110 is a member which is arranged on both surface sides of the substrate 81 of the workpiece 85 and which holds the workpiece 85, and comprises a lower mold 120 on which the workpiece 85 is placed and an upper mold 125 which is arranged above the workpiece 85. In the mold 110, predetermined concave/convex surface shapes 122, 127 are formed in the mold surfaces 121, 126 of one or both of the lower mold 120 and the upper mold 125. In the illustrated example, the concave/convex surface shapes 122, 127 are formed on the mold surfaces 121, 126. By imparting the concave/convex surface shape 122 (127) of the mold surface 121 (126) with a particularly fine concave/convex surface shape, a fine concave/convex shape can be stably formed with high accuracy on the film-like resin layer. The concave/convex surface shapes 122, 127 of the lower mold 120 and the upper mold 125 may be the same or may be different. Furthermore, as shown in FIG. 3(a), interleaving paper (release paper) 115 for facilitating release of the molded workpiece (thin plate-like laminate 80) may be interposed between the mold surfaces 121, 126 of the mold 110 and the workpiece 85 as needed. Note that in FIG. 3(b), interleaving paper has been omitted.

The mold 110 is configured so as to be capable of being moved between the setting part 30, the heating part 40, the pressurization part 50, and the extraction part 60 by the mold retention structure 100. The mold retention structure 100 is not particularly limited as long as it is capable of moving the mold 110 between the parts 30, 40, 50, and 60 while holding the workpiece 85. For example, an appropriate structure such as a structure having clip members or the like for holding the lower mold 120 and the upper mold 125 can be adopted.

Figure 4:
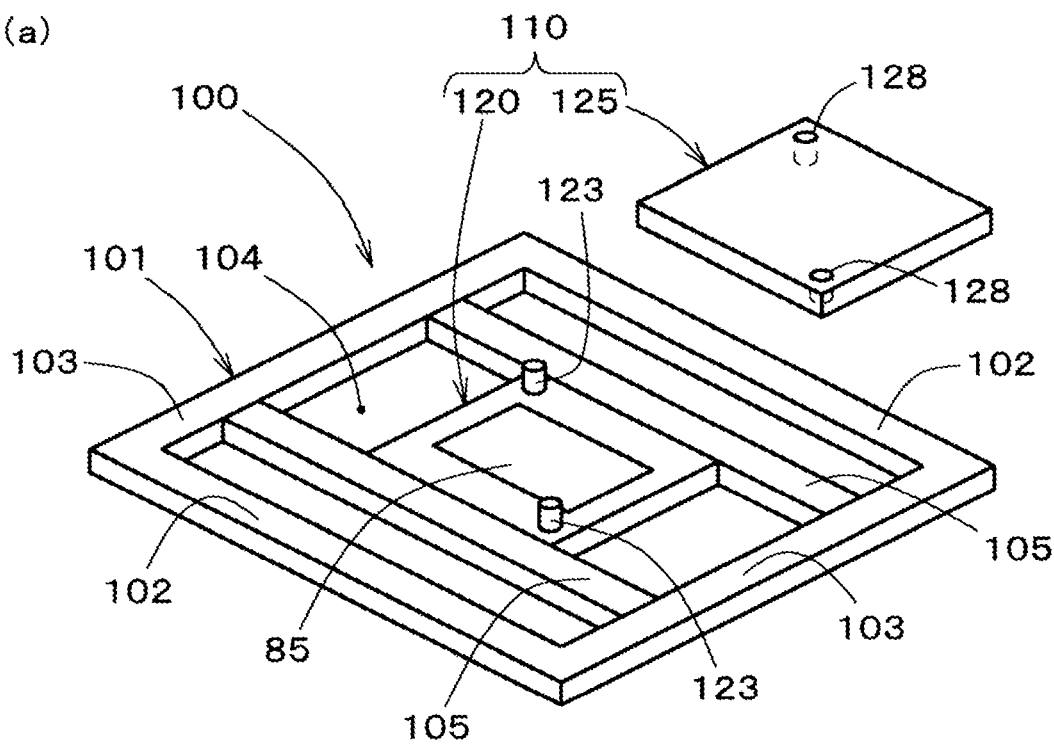
FIG. 4 shows perspective views of a mold retention structure.
Figure 4:
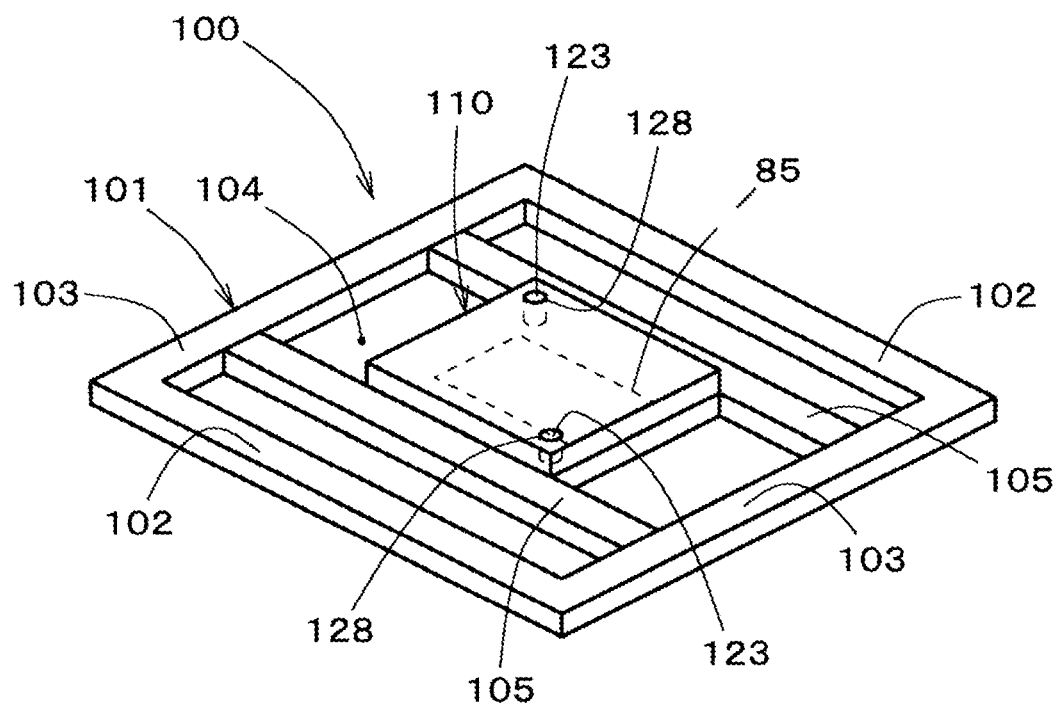

The mold retention structure 100 shown in FIG. 4 is an example of a frame-like structure which retains the mold 110 in which the workpiece 85 is held, and moves between the setting part 30, the heating part 40, the pressurization part 50, and the extraction part 60 along the rail body 21. The mold retention structure 100 comprises a retention body 101 which has a lower opening 104, which is placed on the rail body 21, and which is capable of sliding, and a pair of mold retention parts 105, 105 which retain the lower mold 120 of the mold 110. Furthermore, in the mold 110 which is retained by the mold retention structure 100, mating protrusions 123 are provided at a plurality of positions of the lower mold 120, and a plurality of mating holes 128 corresponding to the mating protrusions 123 of the lower mold 120 are provided on the upper mold 125, and by mating the mating protrusions 123 of the lower mold 120 with corresponding mating holes 128 of the upper mold 125, the upper mold 125 is overlaid on the lower mold 120 at an appropriate position.

Figure 5:
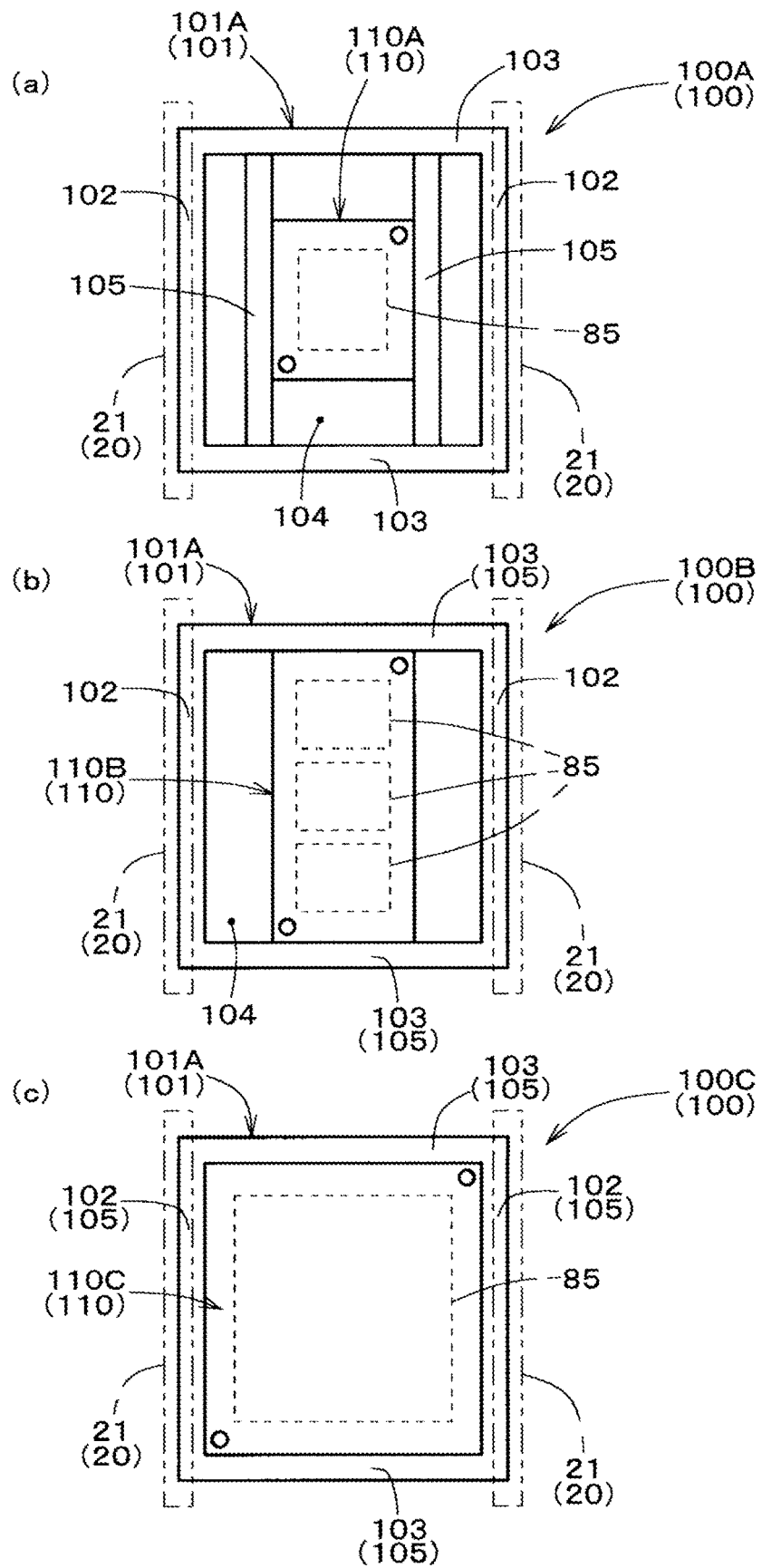
FIG. 5 shows schematic plan views showing variations of a mold retention structure.

FIG. 5 is a schematic plan view showing variations of the mold retention structure 100 and the mold 110. FIG. 5(a) is an example of a mold retention structure 100A in which a mold 110A for processing a single workpiece 85 is retained. The mold retention structure 100A comprises a frame-shaped retention body 101A composed of a pair of side edges 102, 102 which are slidably placed on the rail body 21 and edge parts 103, 103 that extend between both ends of the side edges 102, 102, and a pair of mold retention parts 105A, 105A extending between the edge parts 103, 103, and the mold 110A (lower mold 120) is affixed between the mold retention parts 105A, 105A by means of fixation members (not illustrated) such as screw members.

FIG. 5(b) is an example of a mold retention structure 100B in which a mold 110B for processing of a plurality of workpieces 85 are retained by the same mold surface. In the mold retention structure 100B, the 110B, which is a rectangular mold in a plan view, is arranged between the edge parts 103, 103 of the retention body 101A, and the edge parts 103, 103 are affixed by affixation members (not illustrated) such as screw members as mold retention parts 105, 105.

FIG. 5(c) is an example of a mold retention structure 100C in which a mold 110C for processing a comparatively-large workpiece 85 is retained. In the mold retention structure 100C, the mold 110C corresponding to the size of the entirety of the lower opening 104 is arranged in the lower opening 104 of the retention body 101A, and the side edges 102, 102 and the edge parts 103, 103 of the retention body 101A are affixed by means of affixation members (not illustrated) such as screw members as mold retention parts 105, 105, 105, 105.

The frame-like structure of the mold retention structure is not limited to only the structures 100A to 100C described above, and an appropriate structure can be adopted in accordance with the number and size of workpieces 85, the shape of the mold, etc. For example, a structure in which a recess which can mate with the mold is provided in the mold retention part of the mold retention structure so that the mold can be retained at a predetermined position, or a structure in which an appropriate mold positioning member is provided can be adopted. Furthermore, a movement device which is capable of moving on the rail body 21 may be separately prepared, and a mold retention structure may be installed on the movement device to enable movement.

The setting part 30 comprises a setting device 31 which creates the mold retention structure 100 in which the mold 110 is set. As the setting device 31, a known transport means such as a robot arm by which the retention body 101, the mold 110, and the workpiece 85 can be appropriately installed can suitably be used. In the setting device 31 of the Examples, transportation of the retention body 101, the mold 110, and the workpiece 85 between a work table and the rail part 20 is performed, and creation of the mold retention structure 100 is performed.

The heating part 40 comprises a heating device 41 which heats the mold 110 to the thermal deformation temperature of the film-like resin composition 84. The heating device 41 is not particularly limited as long as it is capable of efficiently heating the mold 110. The heating device 41 of the Examples comprises hot plates 42, 43 which are capable of being raised and lowered and which are arranged above and below the rail body 21, and the heating device 41 is configured so as to hold and heat the mold 110 by means of the upper hot plate 42 and the lower hot plate 43.

The thermal deformation temperature is a sufficient temperature at which the film-like resin composition 84 of the workpiece 85 held by the mold 110 can be thermally deformed and appropriately processed, and is appropriately set in accordance with the type of the film-like resin composition 84. For example, the mold 110 is heated to a temperature higher than the melting point of the film-like resin composition 84 by 50° C. or more. Note that the upper limit thereof is not particularly limited, but since there is a risk that the film-like resin composition 84 of the workpiece 85 may react with oxygen in the atmosphere and oxidize and deteriorate due to excessive heating, the temperature may be set such that the film-like resin composition 84 is less likely to undergo oxidative deterioration due to heat.

The heating of the mold 110 by the heating device 41 may be performed on the mold 110 in a state in which the workpiece 85 is held thereby, or may be performed on the mold 110 in a state in which the workpiece 85 is not held thereby. When the mold 110, which holds the workpiece 85, is heated, excessive heating of the mold 110 is unnecessary, which is economically advantageous. Furthermore, when heating the mold 110, which is not holding the workpiece 85, since only the mold 110 is heated, it can be heated to a high temperature in a short time to shorten the operation time, and oxidation of the film-like resin composition 84 of the workpiece 85 due to the heating is suppressed, which enables high-quality molding.

Figure 6:
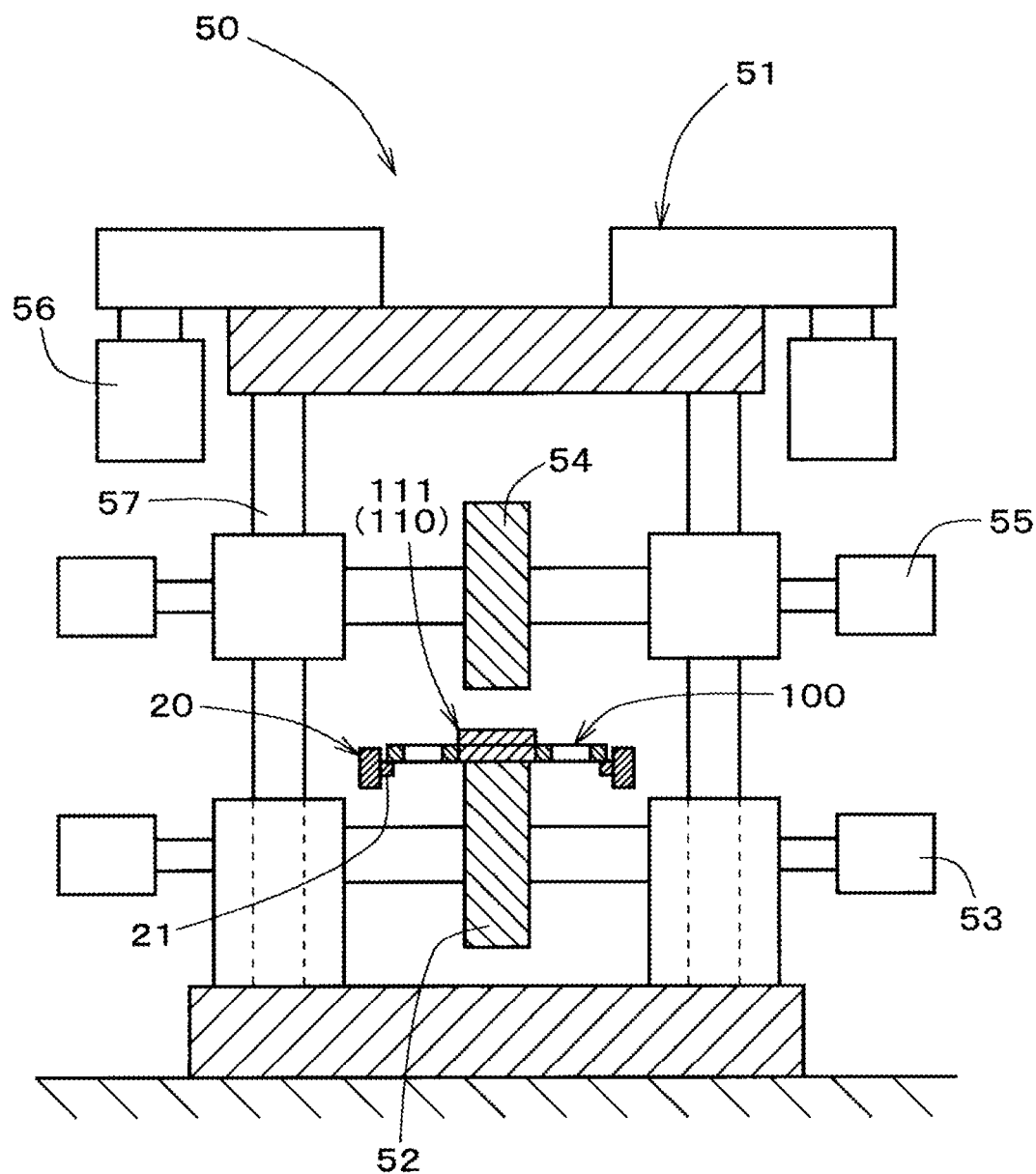
FIG. 6 is a schematic diagram of a side view of a pressurization part.
Figure 7:
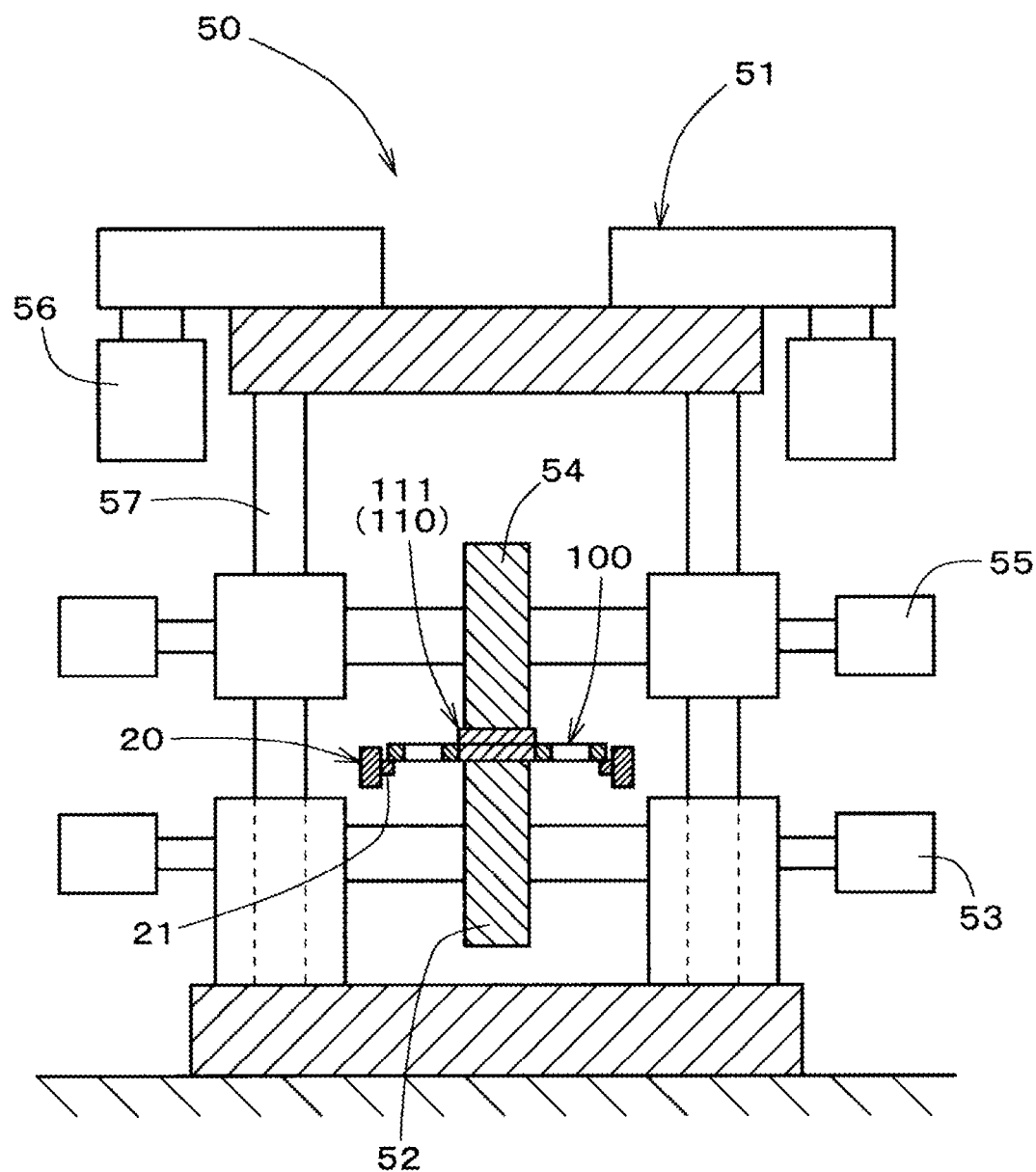
FIG. 7 is a schematic diagram of a side view of a pressurization part at the time of processing.

The pressurization part 50, as shown in FIGS. 6 and 7, comprises a compression roller device 51 which compresses the outer surfaces of the heated mold 110 to form the thin plate-like laminate 80. The compression roller device 51 comprises a lower compression roller 52 which is arranged so as to be capable of rotating in a position in which it abuts the lower surface side of the mold 111, an upper compression roller 54 which is arranged in a position directly above the lower compression roller 52 and so as to be capable of rotating on the upper side of the mold retention structure 100, and a pressurization part lifting means 56 comprising a pressure cylinder or the like which raises and lowers the upper compression roller 54. Furthermore, though not illustrated, the compression roller device 51 comprises a temperature adjusting means for adjusting the temperature of one or both of the lower compression roller 52 and the upper compression roller 54. In the drawings, reference sign 53 represents a lower rotational drive device which rotationally-drives the lower compression roller 52, reference sign 55 represents an upper rotational drive device which rotationally-drives the upper compression roller 54, and reference sign 57 represents a rod part of the pressurization part lifting means 56.

In the compression roller device 51, as shown in FIG. 7, the mold retention structure 100, after heating of the mold 110, is introduced between the two compression rollers, and the outer surfaces of the mold 110 are compressed by rotating the compression rollers to integrally thermocompression-bond the film-like resin composition 84 and the substrate 81 to form the thin plate-like laminate 80 having the film-like resin layer 82. The compression roller device 51 of the Examples has a drive control device which controls the rotation of the lower compression roller 52 and the upper compression roller 54, and when the mold 111 is compressed, the rotation of the two compression rollers 52, 54 and the shaking of the mold retention structure 100 are controlled so as to be synchronized.

The extraction part 60 comprises an extraction device 61 which extracts the mold 110 or workpiece 85 from the mold retention structure 100 after compression. As the extraction device 61, a known transport means such as a robot arm is suitably used, and the extraction device 61 transports the mold retention structure 100, the mold 110, or the workpiece 85 between the work table on which the mold, etc., after processing are placed and the rail part 20, and extracts the mold 110 or workpiece 85 from the mold retention structure 100.

In the device 10 for the production of a thin plate-like laminate of the present invention, a cooling part 70 may be arranged as needed. The cooling part 70 comprises a cooling device 71 which cools the mold 110 compressed by the compression roller device 51. The cooling device 71 is not particularly limited as long as it is capable of cooling the thin plate-like laminate 80 via the mold 110. For example, the cooling device 71 shown in FIG. 1 comprises cooling plates 72, 73 which are capable of being raised and lowered and which are arranged above and below the rail body 21, and the cooling device 71 is configured so as to hold and cool the mold 110 retained in the mold retention structure 100 by means of the upper cooling plate 72 and the lower cooling plate 73. By cooling the mold after compression in the cooling part 70, the shape of the concave/convex surface of the thin plate-like laminate 80 can be stabilized.

Figure 8:
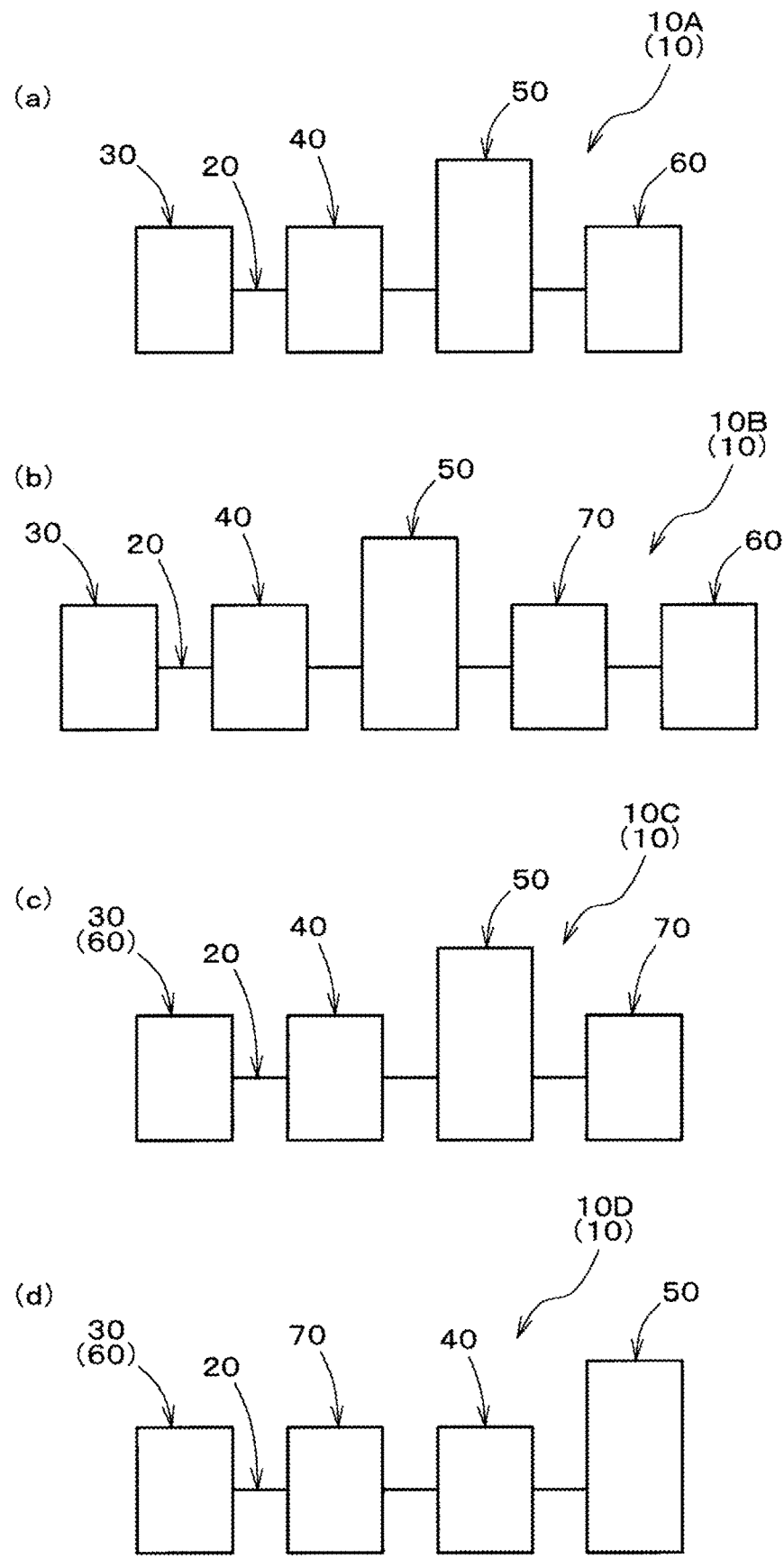
FIG. 8 shows first schematic views showing array combinations of constituent parts of a device for the production of a thin plate-like laminate.
Figure 9:
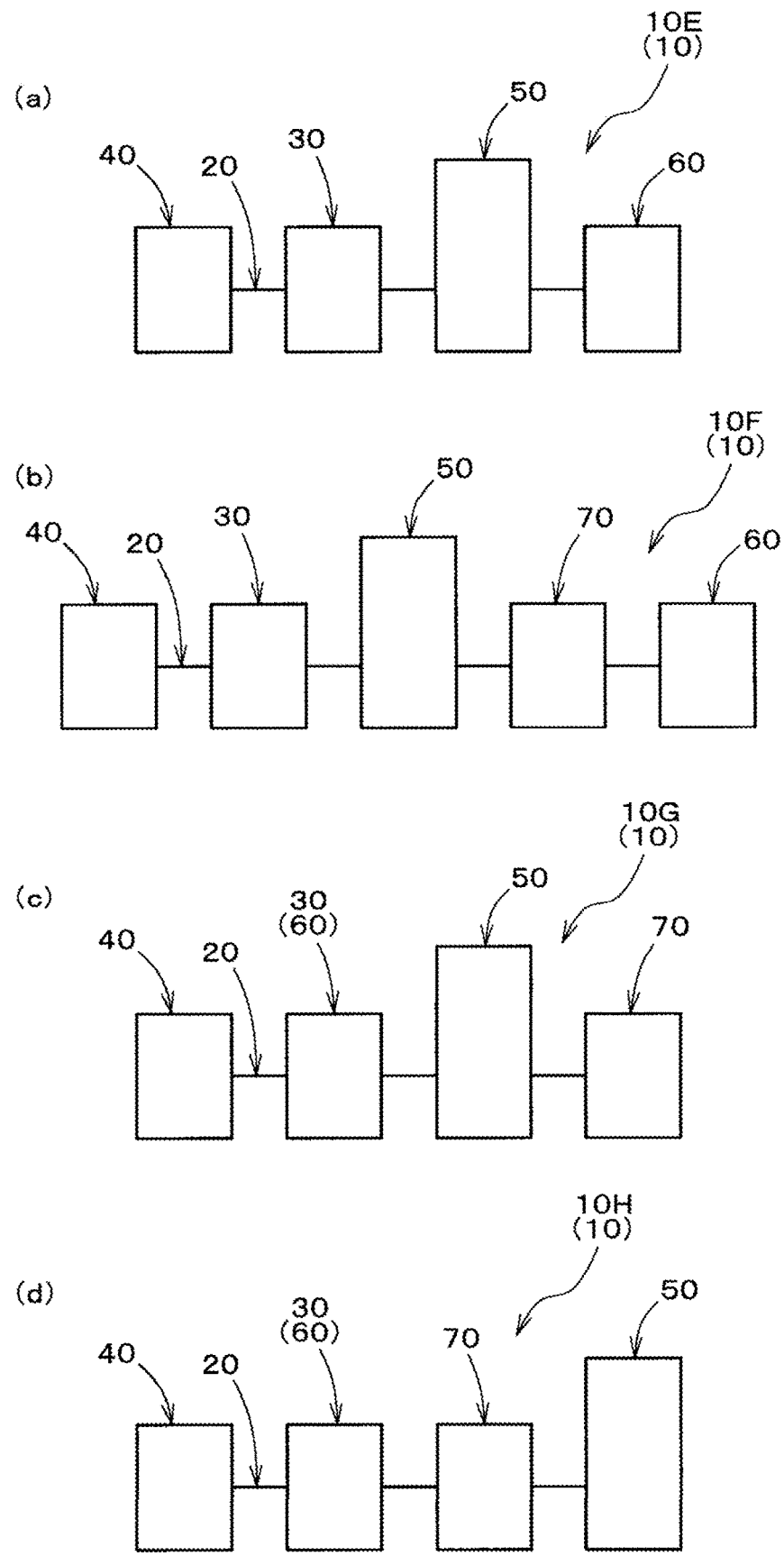
FIG. 9 shows second schematic views showing array combinations of constituent parts of the device for the production of a thin plate-like laminate.

An array combination of the setting part 30, the heating part 40, the pressurization part 50, the extraction part 60, and the cooling part 70 of the device 10 for the production of a thin plate-like laminate of the present invention will be described. FIG. 8 shows variations (10A to 10D) of the device for the production of a thin plate-like laminate in which after the workpiece is held by the molds in the setting part 30 and the mold retention structure is created, the molds holding the workpiece are heated in the heating part 40. Furthermore, FIG. 9 shows variations (10E to 10H) of the device for the production of a thin plate-like laminate in which after the molds which are not holding the workpiece are heated in the heating part 40, the workpiece is held in molds in the setting part 30 and the mold retention structure is created.

The device 10A for the production of a thin plate-like laminate shown in FIG. 8(a) is an example in which the setting part 30, the heating part 40, the pressurization part 50, and the extraction part 60 are arranged in series on the rail part 20. In the device 10A for the production of a thin plate-like laminate, the workpiece is transported from the downstream side of the rail part 20 (setting part 30 side) and processed, and the processed thin plate-like laminate is transported to the upstream side of the rail part 20 (extraction part 60 side). Thus, the device 10A can be incorporated into the line process of a production line of various products using the thin plate-like laminates, and the thin plate-like laminates extracted by the extraction part 60 can be continuously transferred to another processing process.

The device 10B for the production of a thin plate-like laminate shown in FIG. 8(b) is an example in which the cooling part 70 is provided between the pressurization part 50 and the extraction part 60, and the setting part 30, the heating part 40, the pressurization part 50, the cooling part 70, and the extraction part 60 are arranged in series in this order on the rail part 20. In the device 10B for the production of a thin plate-like laminate, the shape of the concave/convex surface of the thin plate-like laminate can be stabilized by the cooling part 70, and the device 10B for the production of a thin plate-like laminate can be incorporated into the line process of a production line in the same manner as the production device 10A.

The device 10C for the production of a thin plate-like laminate shown in FIG. 8(c) is an example in which the setting part 30 and the extraction part 60 are shared, and the setting device 31 and the extraction device 61 are shared, and the setting part 30, which also serves as the extraction part 60, the heating part 40, the pressurization part 50, and the cooling part 70 are arranged in series on the rail part 20 in this order. In the device 10C for the production of a thin plate-like laminate, since the setting part 30 and the extraction part 60 are configured so as to be shared, the space for the production device 10C can be reduced, and equipment to be used can be omitted to reduce cost. Furthermore, since the workpiece transported from the setting part 30 is processed by the pressurization part 50 and then returned to the setting part 30 (which also serves as the extraction part 60) and extracted, man-hours during batch work can be reduced and work efficiency can be improved.

The device 10D for the production of a thin plate-like laminate shown in FIG. 8(d) is an example in which the setting part 30 and the extraction part 60 are shared, and the setting device 31 and the extraction device 61 are shared, and the setting part 30, which also serves as the extraction part 60, the cooling part 70, the heating part 40, and the pressurization part 50 are arranged in series on the rail part 20 in this order. In the device 10D for the production of a thin plate-like laminate, since the pressurization part 50 is arranged on the outermost side of the production device 10D, maintenance operations such as preparation of the compression roller device of the pressurization part 50 becomes easy. Like the production device 10C, space can be reduced to reduce cost, and work efficiency can be improved during batch work.

The device 10E for the production of a thin plate-like laminate shown in FIG. 9(a) is an example in which the heating part 40, the setting part 30, the pressurization part 50, and the extraction part 60 are arranged in series on the rail part 20 in this order. In other words, the device 10E for the production of a thin plate-like laminate is configured such that the setting part 30 and the heating part 40 are reversed as compared to the device 10A for the production of a thin plate-like laminate. Thus, the workpiece is processed while being transported from the downstream side (the heating part 40 side) of the rail part 20 to the upstream side (the extraction part 60 side). Therefore, the device 10E for the production of a thin plate-like laminate can be incorporated into the line process of a production line of various products in the same manner as the production 10 device 10A, and the produced thin plate-like laminates can be continuously transferred to another processing process.

The device 10F for the production of a thin plate-like laminate shown in FIG. 9(b) is configured such that the setting part 30 and the heating part 40 are reversed as compared to the device 10B for the production of a thin plate-like laminate, and is an example in which the heating part 40, the setting part 30, the pressurization part 50, the cooling part 70, and the extraction part 60 are arranged in series on the rail part 20 in this order. In the device 1OF for the production of a thin plate-like laminate, in the same manner as the device 10B for the production of a thin plate-like laminate, the shape of the concave/convex surface of the thin plate-like laminate can be stabilized by the cooling part 70, and the device 10F for the production of a thin plate-like laminate can be incorporated into the line process of a production line.

The device 10G for the production of a thin plate-like laminate shown in FIG. 9(c) is configured such that the setting part 30 and the heating part 40 are reversed as compared to the device 10C for the production of a thin plate-like laminate, and is an example in which the heating part 40, the setting part 30, which serves as the extraction part 60, the pressurization part 50, and the cooling part 70, are arranged in series on the rail part 20 in this order. In the device 10G for the production of a thin plate-like laminate, in the same manner as the device 10C for the production of a thin plate-like laminate, the space for the production device 10G can be reduced, equipment to be used can be omitted to reduce the cost, man-hours during batch work can be reduced, and work efficiency can be improved.

The device 1011 for the production of a thin plate-like laminate shown in FIG. 9(d) is an example in which the heating part 40, the setting part 30, which serves as the extraction part 60, the cooling part 70, and the pressurization part 50 are arranged in series on the rail part 20 in this order. In the device 10H for the production of a thin plate-like laminate, maintenance operations such as preparation of the compression roller device of pressurization part 50 becomes easy. Furthermore, like the production device 10G, space can be reduced to reduce cost, and work efficiency can be improved during batch work.

Next, a method for the production of a thin plate-like laminate 80 by the production device 10 of the present invention will be described. The method for the production of the thin plate-like laminate 80 is a method in which the mold 110 is arranged on both sides of the workpiece 85 in which the film-like resin composition 84 is laminated on at least one surface of the substrate 81 and the outer surfaces of the mold 110 are compressed to integrally form the film-like resin composition 84 and the substrate 81, and includes a mold retention structure creation step, a compression step, and an extraction step.

The mold retention structure creation step is a step of creating a mold retention structure in which the molds 110 heated to the thermal deformation temperature of the film-like resin composition 84 are arranged on both sides of the workpiece 85. This mold retention structure creation step is configured such that as shown in, for example, FIG. 10(a), the heating step is performed in the heating part 40 after the setting step performed in the setting part 30.

Figure 10:
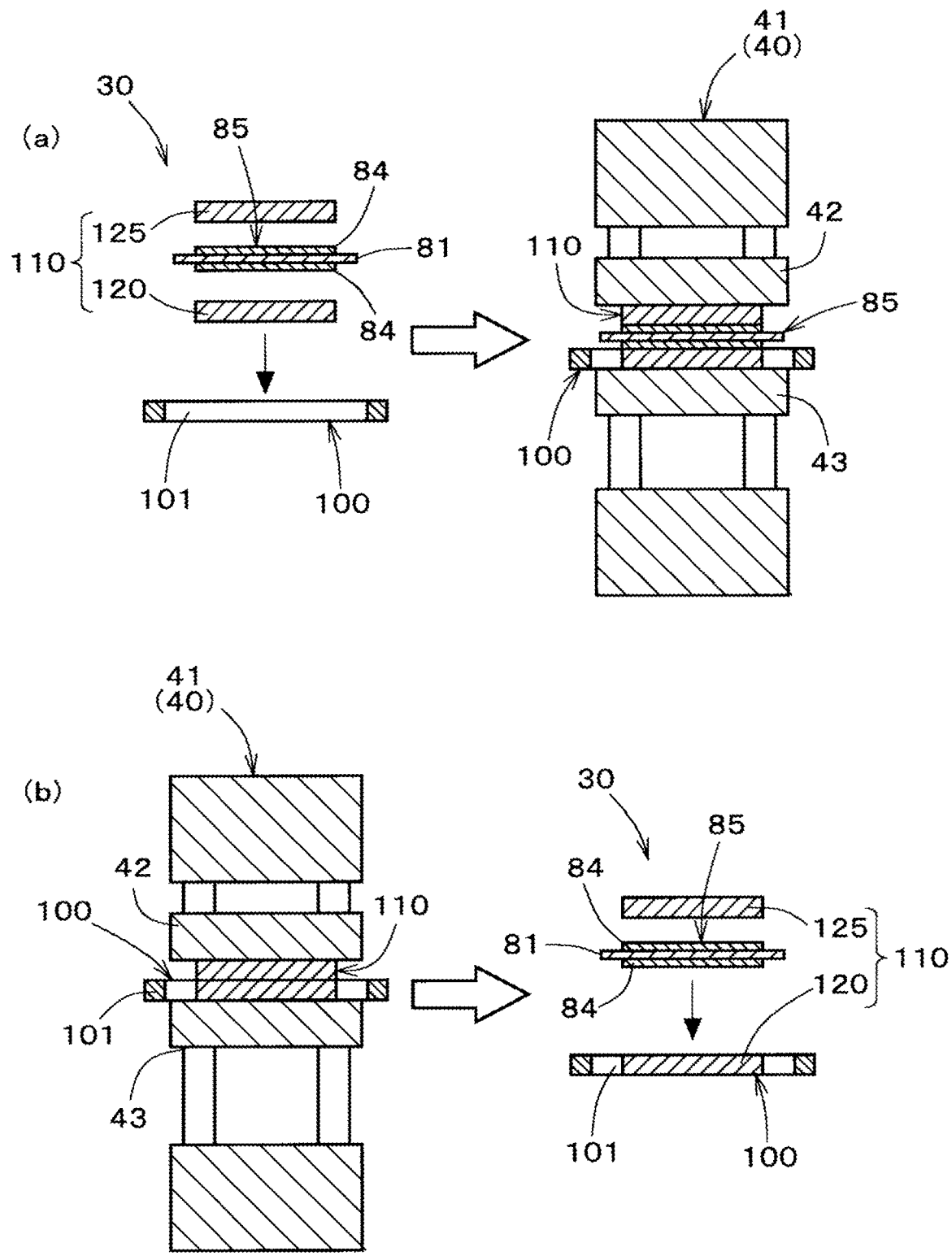
FIG. 10 shows schematic diagrams of a mold retention structure creation step.
Figure 11:
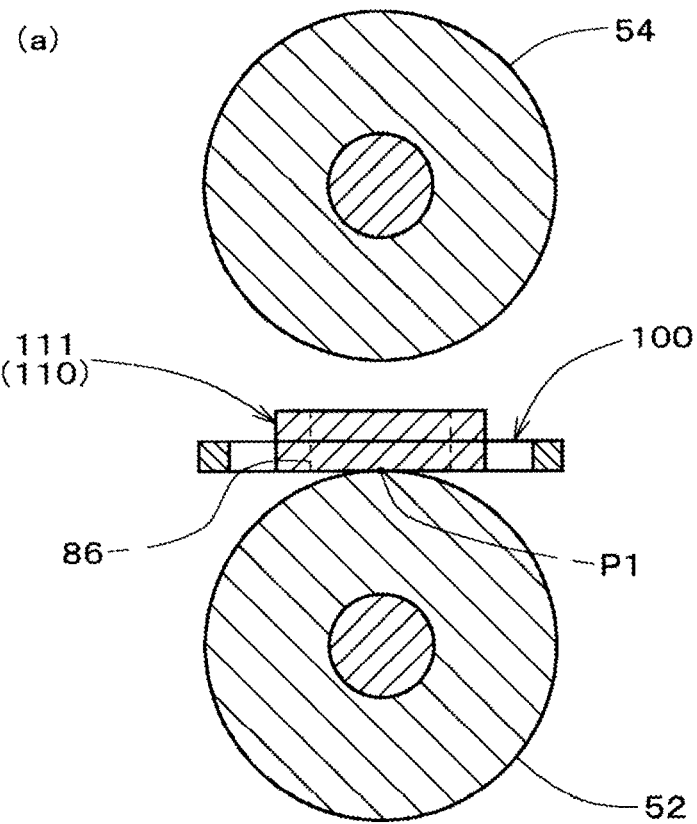
FIG. 11 shows first schematic diagrams showing a workpiece compression processing step.
Figure 11:
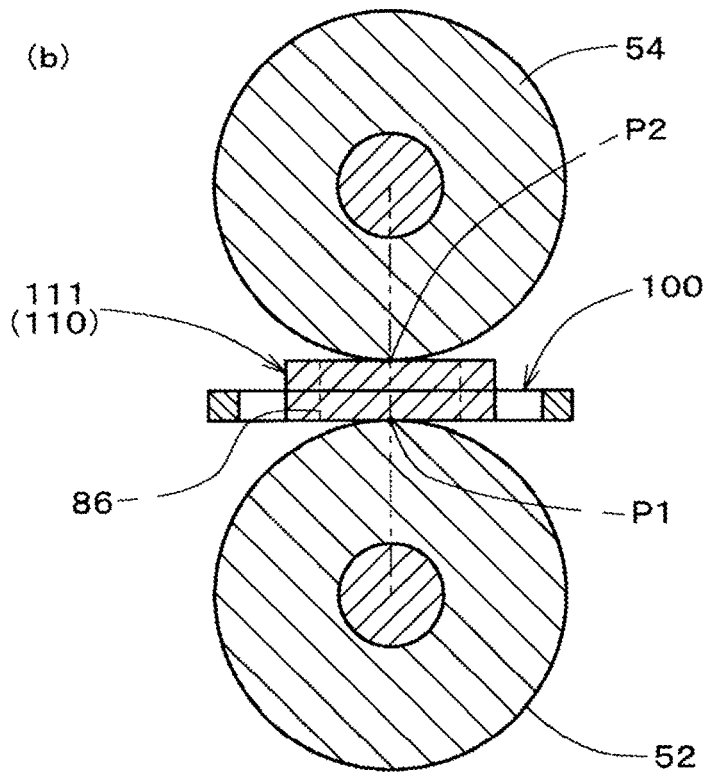

The setting step shown in FIG. 10(a) is a step in which, in the setting part 30, using the setting device 31 (illustration omitted), the mold retention structure 100 in which the molds 110 are arranged on both surface sides of the workpiece 85 is created (setting step prior to heating). In the setting step, processes such as transporting the mold retention structure 100 onto the rail body 21 of the rail part 20 by the setting device 31, such as a robot arm, transporting the lower mold 120 and the upper mold 125 of mold 110 to the mold retention structure 100 and retaining them therein, and transporting the workpiece 85 to the mold are performed. In the Examples, the lower mold 120 of the mold 110 is retained in advance in the retention body 101 of the mold retention structure 100, and after the workpiece 85 is placed on the lower mold 120, the mold retention structure 100 retaining the lower mold 120 is transported onto the rail body 21, and thereafter setting processing in which the upper mold 125 is overlaid on the lower mold 120 is performed.

The heating step shown in FIG. 10(a) is a step in which, in the heating part 40, using the heating device 41, the entirety of the mold 110 after creation of the mold retention structure 100 is heated to the thermal deformation temperature of the film-like resin composition 84 (heating step after setting). In the heating step, a process in which the lower mold 120 and the upper mold 125 of the mold 110 are heated by the heating device 41, and the workpiece 85 held in the mold 110 is heated to the thermal deformation temperature is performed on the mold retention structure 100, which has moved from the setting part 30 to the heating part 40. As a result, in the compression step, which is described later, suitable processing of the workpiece 85 is enabled. In the Examples, there is performed a process in which the upper and lower hot plates 42, 43 of the heating device 41 are lowered and raised, respectively, and the mold 110 retained in the mold retention structure 100 on the rail body 21 is heated while being interposed by the hot plates 42, 43. Note that the heating temperature is determined in accordance with the material of the film-like resin composition of the workpiece.

As described above, in the mold retention structure creation step in which heating of the molds 110 is performed after the workpiece 85 is held in the molds 110 and the mold retention structure 100 is set, excessive heating of the mold 110 is unnecessary, which is economically advantageous.

Furthermore, the mold retention structure creation step may be configured such that the setting step is performed in the setting part 30 after the heating step performed in the heating part 40, as shown in FIG. 10(b), instead of performing the heating step after the setting step.

The heating step shown in FIG. 10(b) is a step (heating step prior to setting) in which, in the heating part 40, using the heating device 41, the mold is heated to the thermal deformation temperature of the film-like resin composition 84. In this heating step, a process in which the lower mold 120 and the upper mold 125 of the mold 110 are heated by the heating device 41 is performed on the molds 110 which are retained in the retention body 101 and which do not hold the workpiece 85. As a result, the mold 110 can be heated to a high temperature in a short time, and oxidation of the film-like resin composition 84 of the workpiece 85 by the heating is suppressed, which enables high-quality molding.

The setting step shown in FIG. 10(b) is a step (setting step after heating) in which, in the setting part 30 using the setting device 31 (illustration omitted), the workpiece 85 is held in the heated mold 110, and the mold retention structure 100 is created. In this setting step, a setting process in which after the upper mold 125 of the mold 110 retained in the retention body 101 is temporarily removed by the setting device 31, such as a robot arm, the workpiece 85 is placed on the lower mold 120, and then the upper mold 125 is overlaid on the lower mold 120 is performed.

As described above, in the mold retention structure creation step in which the workpiece 85 is held in the mold 110 and the mold retention structure 100 is set after the mold 110 is heated, since only the mold 110 is heated, it can be heated to a high temperature in a short time, which reduced operation time, and oxidation of the film-like resin composition 84 of the workpiece 85 by the heating is suppressed, which enables high-quality molding.

The compression step is a step in which, in the pressurization part 50 as shown in FIGS. 6, 7, 11, and 12, the mold retention structure 100, in which the heated mold 110 is arranged, is introduced between the two compression rollers 52, 54 of the compression roller device 51 and the outer surfaces of the mold 111 are compressed by rotating the compression rollers 52, 54 to integrally thermocompression-bond the film-like resin composition and the substrate to form the thin plate-like laminate 80 having the film-like resin layer 82. In the compression step, a process in which the entirety of the workpiece 85 held in the mold 111 is roll-pressed while shaking the mold retention structure 100 is performed on the heated mold 111 of the mold retention structure 100, which has moved from setting part 30 or the heating part 40 to the pressurization part 50.

In the Examples, regarding the mold 111 of the mold retention structure 100, which has moved to the pressurization part 50, as shown in FIG. 11(a), since the upper end of the lower compression roller 52 is positioned at the same height as the lower surface of the mold 111, the lower compression roller 52 and the lower surface of the mold 111 enter a contact state (contact position P1). Next, the upper compression roller 54 above the mold retention structure 100 is lowered by the pressurization part lifting means 56, the upper compression roller 54 is pressed against the upper surface side of the heated mold 111 retained in the mold retention structure 100, and the mold 111 is compressed by the two compression rollers 52, 54 (refer to FIG. 7). In the compression by the two compression rollers 52, 54, as shown in FIG. 11(b), the upper compression roller 54 contacts (P2) and presses the mold 111 at a position directly above the contact position P1 between the lower compression roller 52 and the mold 111. Thus, the mold 111 is subjected to the compression force from the two compression rollers 52, 54 between the contact position P1 with the lower compression roller 52 and the contact position P2 with the upper compression roller 54.

Figure 16:
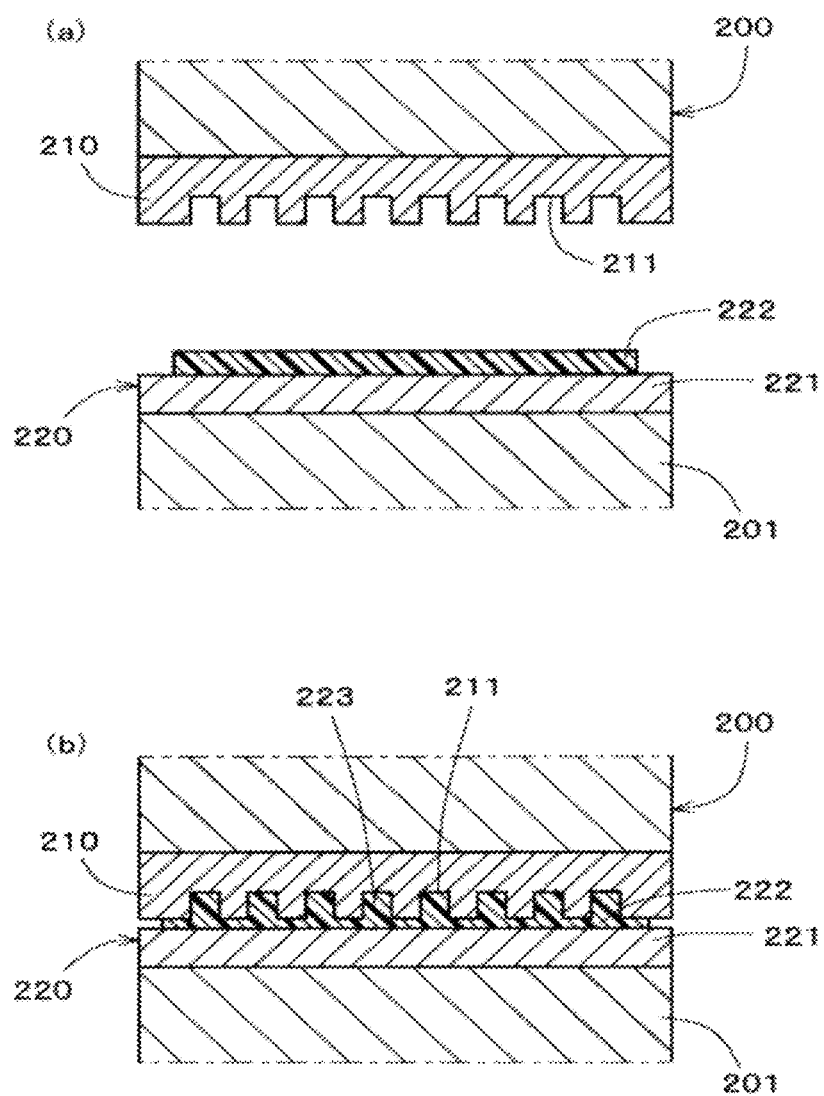
FIG. 16 shows schematic cross-sectional views showing the processing steps of a thin plate-like laminate of the prior art.

In processing methods such as transfer molding of the prior art, as shown in FIG. 16, since the entirety of the mold 210 is pressed by the pressurizing means 200 such as a pressing device, a pressing force acts on the mold 210 in a two-dimensional (planar) manner. When pressure is applied in a planar manner, the pressure is dispersed so as to act on the entirety of the mold 210, and the pressing force does not always act uniformly on the entire mold 210, which may cause pressure unevenness. Conversely, in compression by the two compression rollers 52, 54 shown in FIG. 11(b), a one-dimensional (linear) pressing force between the contact positions P1 and P2 acts on the mold 111 retained by the mold retention structure 100. Thus, as compared with the conventional method in which the pressure acts two-dimensionally (planar), the pressure is concentrated and it becomes easier to apply a large pressing force, and moreover, since the pressurized part of the mold 111 is limited to the portion between the contact positions P1 and P2, the pressurization acts relatively uniformly and the occurrence of pressure unevenness is suppressed.

Figure 12:
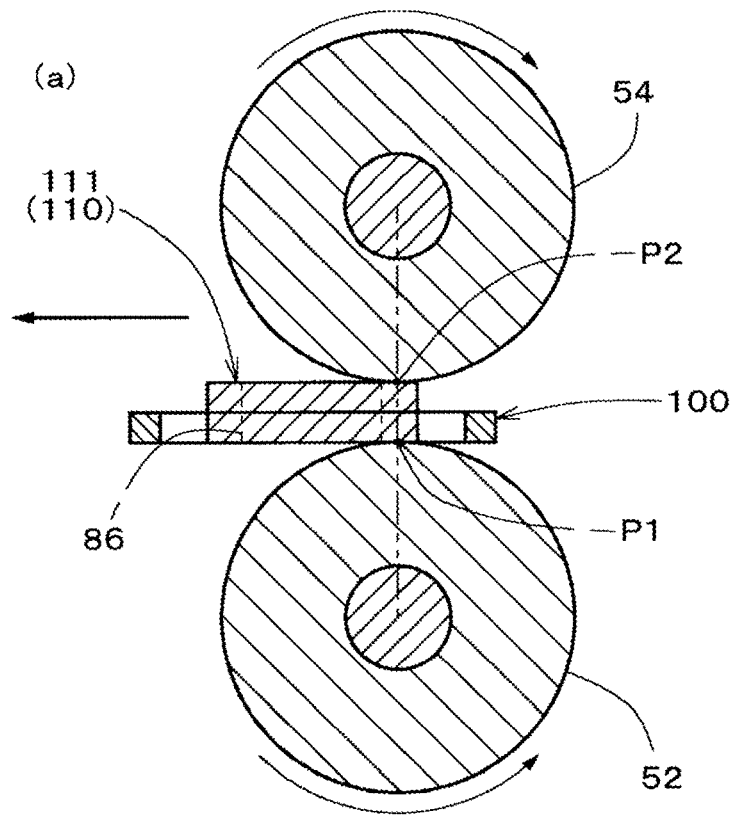
FIG. 12 shows second schematic diagrams showing a workpiece compression processing step.
Figure 12:
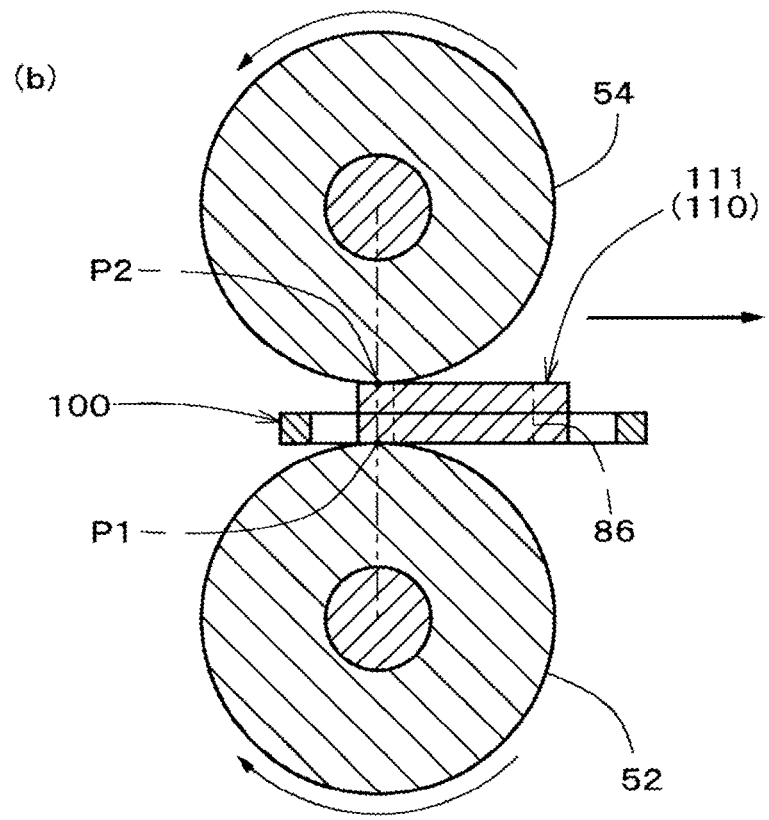

When compression by the two compression rollers 52, 54 is performed, in a state in which the compression is retained, as shown in FIG. 12, the mold retention structure 100 is shaken so that the pressurized portion (between the contact positions P1, P2) of the mold 111 acts at least on the entirety of the workpiece 85 (between positions 86, 86 of the ends of the workpiece 85), which is held in the mold 111 of the mold retention structure 100. In the shaking of the mold retention structure 100, in accordance with the movement of the mold retention structure 100 in one direction (for example, the rearward direction in FIG. 12(a)), the two compression rollers 52, 54 rotate in the same direction (for example, in FIG. 12(a), the lower compression roller 52 rotates in the counterclockwise direction and the upper compression roller 54 rotates in the clockwise direction) in a compressing state, and in accordance with the movement of the mold retention structure 100 in the other direction (for example, the frontward direction of FIG. 12(b)), the two compression rollers 52, 54 rotate in the same direction (for example, in FIG. 12(b), the lower compression roller 52 rotates in the clockwise direction and the upper compression roller 54 rotates in the counterclockwise direction) in a compressing state.

At this time, the shaking of the mold retention structure 100 and the rotational driving of the compression rollers 52, 54 are controlled so as to be performed synchronously by the drive controller (not illustrated) of the pressurization part 50. In other words, the movement timing (shaking timing) of the mold retention structure 100, the rotational timing of the compression rollers 52, 54, the movement direction (shaking direction) of the mold retention structure 100, the rotational directions of the compression rollers 52, 54, the movement distance (shaking range) of the mold retention structure 100, and the rotation amounts of the compression rollers 52, 54 are controlled so as to match. Thus, smooth movement of the mold retention structure 100 is enabled in a state in which the predetermined pressure applied on the mold 111 from the two compression rollers 52, 54 is retained. By shaking the mold retention structure 100 in an interposed state in this manner, the compression position (between P1 and P2) by the two compression rollers 52, 54 extends over the entire surface of the mold 111, whereby the entire surface of the mold 111 can be substantially-uniformly pressurized. The shaking of the mold retention structure 100 is performed as many times as necessary, including once (one round trip), depending on the type of the resin layer, the fineness of the concave/convex shape, the target product, etc. Furthermore, the start position and end position of the compression by the two compression rollers 52, 54 are appropriately determined in accordance with the size of the workpiece 85, the type of the concave/convex shape, etc. When the shaking of the mold retention structure 100 is stopped, the pressurization is completed and the upper compression roller 54 is raised to release the interposed state of the mold 111.

In this compression step, if necessary, the temperature of one or both of the lower compression roller 52 and the upper compression roller 54 may be adjusted by the temperature adjusting means (not illustrated) during the compression by the compression roller device 51. The temperature adjustment by the temperature adjusting means may be any appropriate method such as heating, cooling, and heat retention. For example, in the case of continuously processing a large number of products, if there is a difference in temperature between the mold 110 and the compression rollers 52, 54, the temperature of the mold 110 may change during compression, whereby it may be difficult to perform appropriate processing. Thus, in this temperature adjustment, the temperature of the mold 110 at the time of compression is appropriately maintained by heating or maintaining the temperature when the temperature of the mold 110 is low, or by cooling when the temperature is excessively high.

The extraction step is a step in which, in the extraction part 60, using the extraction device 61, the mold 110 after compression is extracted from the mold retention structure 100. In the extraction step, a process in which the mold retention structure 100 is transported from the rail body 21 of the rail part 20 by the extraction device 61, such as a robot arm, the lower mold 120 and the upper mold 125 of the mold 110 are extracted from the mold retention structure 100, and the workpiece 85 is extracted from the mold 110 is performed on the mold retention structure 100, which has moved from the pressurization part 50 to the extraction part 60. In the examples, there is performed a process in which the upper mold 125 of the mold 110 retained in the mold retention structure 100 is extracted from the lower mold 120, the mold retention structure 100 in which the lower mold 120 is retained is transported from the rail body 21 to another placement position, such as a work table, and the thin plate-like laminate 80 (processed workpiece) placed on the lower mold 120 is extracted. By extracting the thin plate-like laminate 80 from the mold 110, the production method is completed.

When the above extraction step is performed, the thin plate-like laminate 80 immediately after processing is in a state in which it can be easily deformed by the heating of the heating part 40. Thus, before the extraction step is performed, the thin plate-like laminate 80 is cooled to a temperature at which inadvertent deformation does not occur. At that time, it is possible to perform slow-cooling, such as allowing the thin plate-like laminate 80 to stand for a predetermined time without extracting it from the mold 110, but it is preferable that the device 10 for the production of a thin plate-like laminate be provided with a cooling part 70 to perform the cooling step.

The cooling step is a step in which, in the cooling part 70, using the cooling device 71, the entirety of the mold 110 after compression retained in the mold retention structure 100 is cooled. In the cooling step, a process in which the lower mold 120 and the upper mold 125 of the mold 110 are cooled by the cooling device 71, and the processed thin plate-like laminate 80 held in the mold 110 is cooled to a temperature at which inadvertent deformation does not occur is performed on the mold retention structure 100, which has moved from the pressurization part 50 to the cooling part 70. As a result, the shape of the concave/convex surface of the thin plate-like laminate 80 is stabilized, and the molding of the thin plate-like laminate 80 in the mold 110 is complete. In the Examples, there is performed a process in which the upper and lower cooling plates 72, 73 of the cooling device 71 are lowered and raised, respectively, and the mold 110 retained in the mold retention structure 100 on the rail body 21 is cooled while being interposed by the cooling plates 72, 73. After the cooling step has been performed, the mold retention structure 100 is moved from the cooling part 70 to the extraction part 60 and the extraction step described above is performed. Note that the cooling temperature is lower than the thermal deformation temperature of the film-like resin composition 84 by 20° C. or more.

Figure 13:
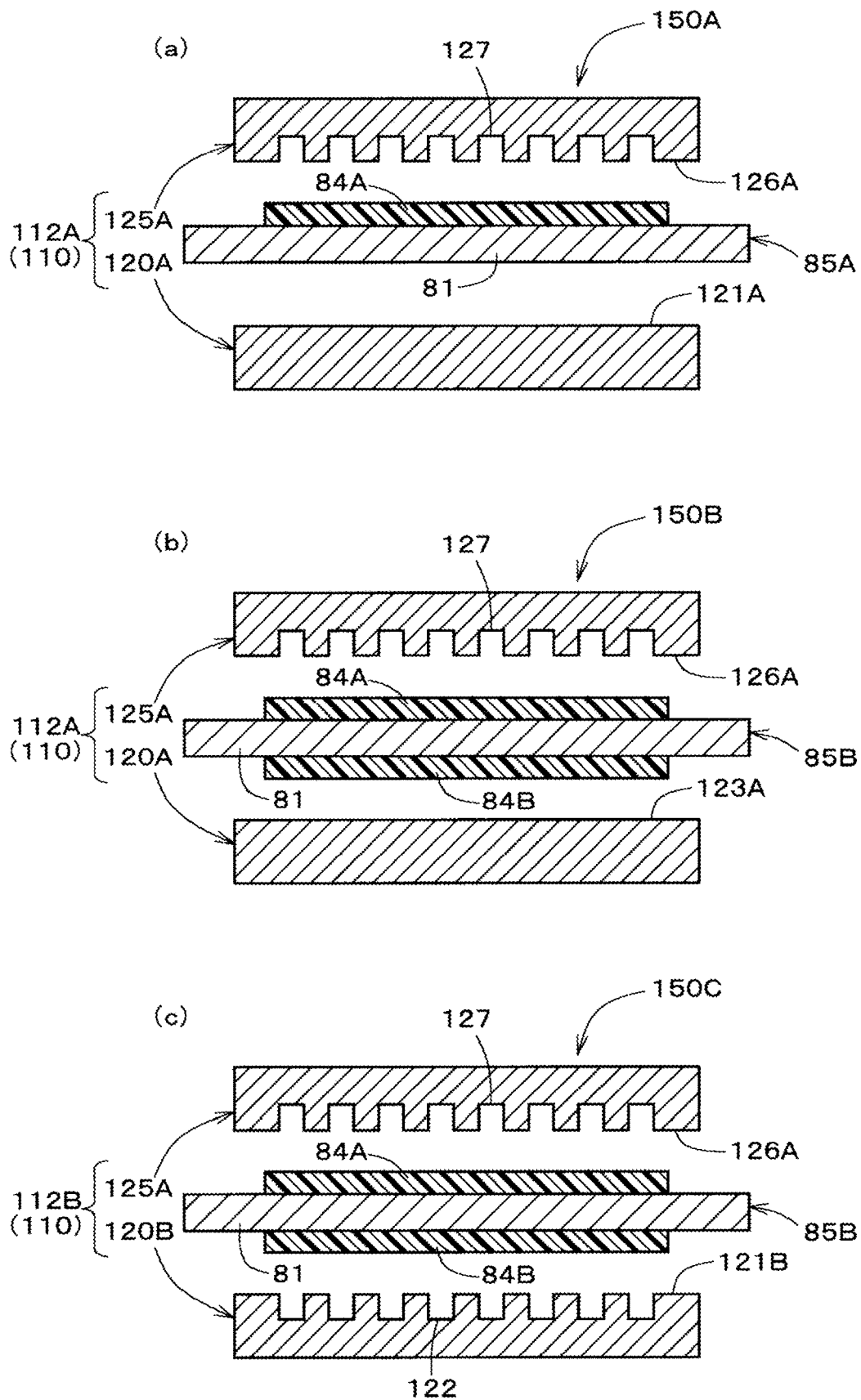
FIG. 13 shows first schematic cross-sectional views showing variations of the relationship between the laminate structure of a workpiece and molds.

Next, variations in the relationship between the laminate structure of the workpiece and the mold therefor will be described using FIGS. 13 to 15. FIG. 13(a) is an example of a mold structure 150A in which a mold 112A for single-side processing is arranged relative to a workpiece 85A in which a film-like resin composition 84A is laminated on one surface side (the upper surface side in the example of the drawing) of the substrate 81. The mold 112A comprises a lower mold 120A having a mold surface 121A, which is a smooth surface, and an upper mold 125A having a mold surface 126A on which the concave/convex surface shape 127 is formed. In the mold structure 150A, the smooth lower mold 120A contacts the second side (the lower surface side) of the substrate 81 of the workpiece 85A, the upper mold 125A on which the concave/convex surface shape 127 is formed contacts the resin composition 84A on the first side (upper surface side) of the substrate 81, whereby the concave/convex shape can be formed on only the resin composition 84A on the first surface side (upper surface side) of the substrate 81.

FIG. 13(b) is an example of a mold structure 150B in which a mold 112A for single-side processing is arranged relative to a workpiece 85B in which film-like resin compositions 84A, 84B are laminated on both surfaces of the substrate 81. In the mold structure 150B, the smooth lower mold 120A contacts the resin composition 84B on the second side (lower surface side) of the substrate 81 of the workpiece 85A, and the upper mold 125A on which the concave/convex surface shape 127 is formed contacts the resin composition 84A on the first side (upper surface side) of the substrate 81. Thus, the resin composition 84B on the second side (lower surface side) of the substrate 81 is formed into a smooth resin layer by the lower mold 120A, and a concave/convex shape can be formed on only the resin composition 84A on the first side (upper surface side).

FIG. 13(c) is an example of a mold structure 150C in which a mold 112B for double-sided processing is arranged relative to a workpiece 85B in which film-like resin compositions 84A, 84B are laminated on both surfaces of the substrate 81. The mold 112B comprises a lower mold 120B having a mold surface 121B on which the concave/convex surface shape 122 is formed, and an upper mold 125A having a mold surface 126A on which the concave/convex surface shape 127 is formed. In the mold structure 150C, the lower mold 120B on which the concave/convex surface shape 122 is formed contacts the resin composition 84B on the second side (lower surface side) of the substrate 81, and the upper mold 125A on which the concave/convex surface shape 127 is formed contacts the resin composition 84A on the first side (upper surface side) of the substrate 81. Thus, concave/convex shapes can be formed on the resin compositions 84B, 84A on the surfaces of the substrate 81 by the lower mold 120B and the upper mold 125A.

According to the mold structure 150A shown in FIG. 13(a), a single resin layer having a concave/convex shape can be appropriately formed on the substrate 81. The mold structures 150B, 150C shown in FIGS. 13(b) and 13(c) are examples of processing of a workpiece 85B in which the film-like resin compositions 84A, 84B are laminated on both surfaces of the substrate 81. In the mold structure 150B, a resin layer having a concave/convex shape and having a predetermined functionality can be formed on one side of the substrate 81, and a resin layer such as a smooth adhesive layer can be formed on the other side. Furthermore, in the mold structure 150C, resin layers having concave/convex shapes and predetermined functionalities can be formed on both surfaces of the substrate 81. In particular, in the mold structure 150C, by providing the lower mold 120B and the upper mold 125A with different concave/convex shapes, concave/convex shapes having different patterns can be formed on the surfaces of the substrate 81. By laminating the resin compositions 84A, 84B on the surfaces of the substrate 81 in this manner, products with various functionalities can easily be produced.

Figure 14:
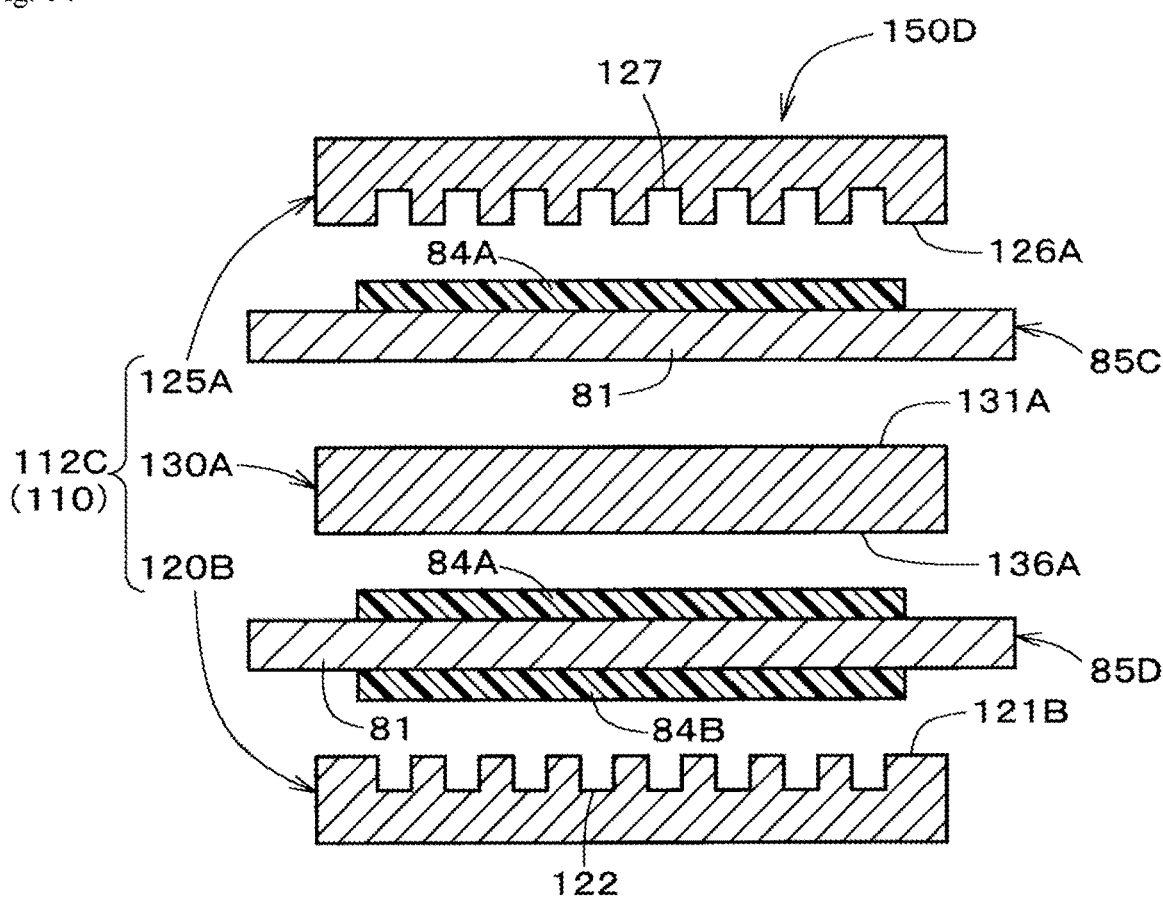
FIG. 14 is a second schematic cross-sectional view showing variations of the relationship between the laminate structure of a workpiece and molds.
Figure 15:
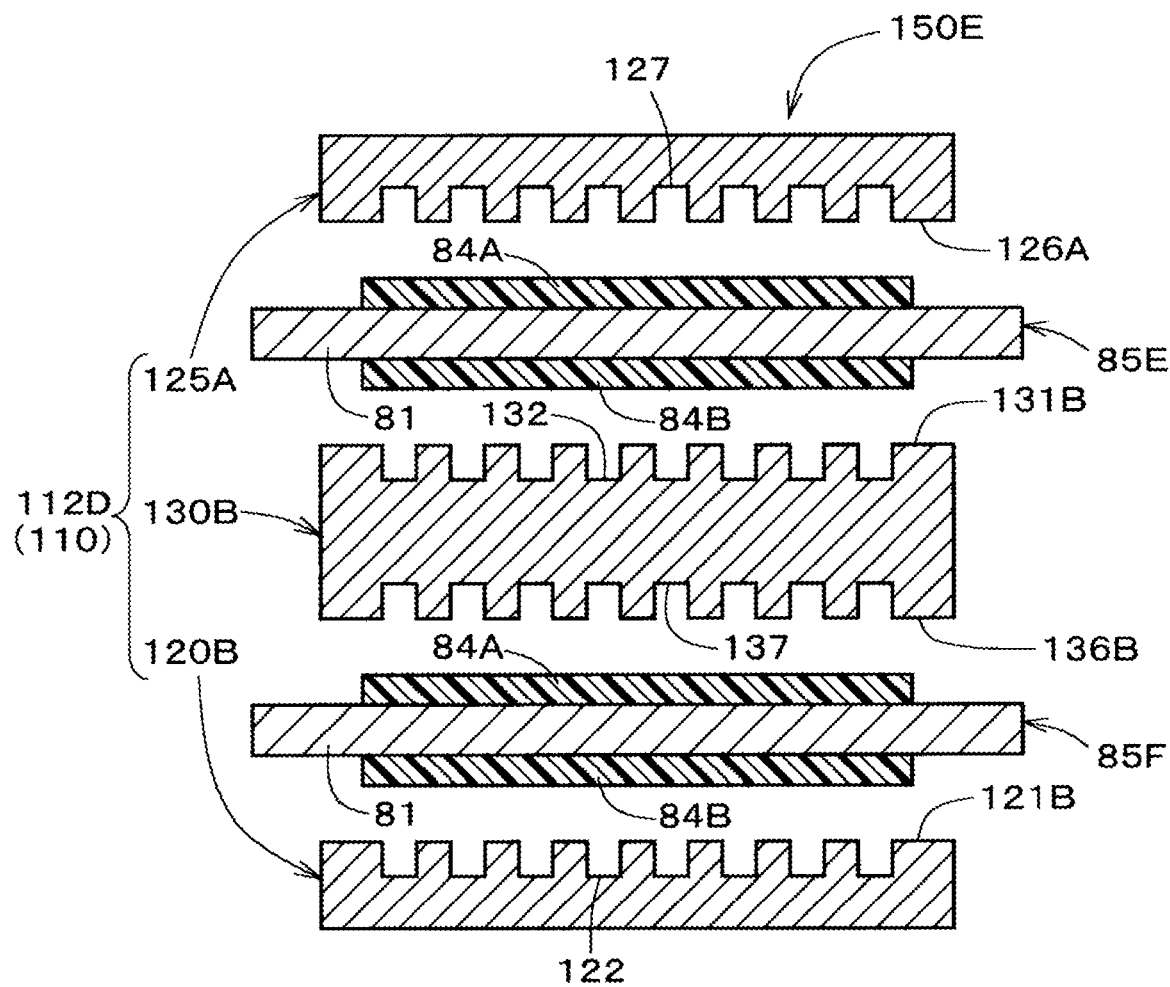
FIG. 15 is a third schematic cross-sectional view showing a variation of the relationship between the laminate structure of a workpiece and molds.

FIGS. 14 and 15 are examples of mold structures 150D, 150E in which processing is performed simultaneously on a plurality (two in the examples of the drawings) of workpieces. In the mold structure 150D shown in FIG. 14, a mold 112C which is capable of processing a plurality of workpieces is arranged relative to a workpiece 85C in which the film-like resin composition 84A is laminated on one surface side (the upper surface side in the example of the drawing) of the substrate 81 and another workpiece 85D in which film-like resin compositions 84A, 84B are laminated on both surfaces of the substrate 81. The mold 112C comprises a lower mold 120B having a mold surface 121B on which the concave/convex surface shape 122 is formed, an upper mold 125A having a mold surface 126A on which the concave/convex surface shape 127 is formed, and a middle mold 130A having smooth mold surfaces 131A, 136A on both surfaces thereof.

In the mold structure 150D, the lower mold 120B on which the concave/convex surface shape 122 is formed contacts the resin composition 84B on the second side (lower surface side) of the substrate 81 of the second workpiece 85D, the upper mold 125A on which the concave/convex surface shape 127 is formed contacts the resin composition 84A on the first side (upper surface side) of the substrate 81 of the first workpiece 85C, the middle mold 130A is interposed between the first workpiece 85C and the second workpiece 85D, the smooth upper mold surface 131A of the middle mold 130A contacts the second side (lower surface side) of the substrate 81 of the first workpiece 85C, and the smooth lower mold surface 136A of the middle mold 130A contacts the resin composition 84A on the first side (upper surface side) of the substrate 81 of the second workpiece 85D. Thus, the concave/convex shape is formed on only the resin composition 84A on the first side (upper surface side) of the one workpiece 85C by the upper mold 125A, and on the second workpiece 85D, the concave/convex shape is formed on only the resin composition 84B on the second side (lower surface side) of the substrate 81 by the lower mold 120A, and the resin composition 84A on the first side (upper surface side) can be formed as a smooth resin layer.

In the mold structure 150E shown in FIG. 15, a mold 112D which is capable of processing a plurality of workpieces is arranged relative to a workpiece 85E in which the film-like resin compositions 84A, 84B are laminated on both surfaces of the substrate 81 and another workpiece 85F in which the film-like resin compositions 84A, 84B are likewise laminated on both surfaces of the substrate 81. The mold 112D comprise a lower mold 120B having a mold surface 121B on which the concave/convex surface shape 122 is formed, an upper mold 125A having a mold surface 126A on which the concave/convex surface shape 127 is formed, and a middle mold 130B having mold surfaces 131B, 136B on which the concave/convex surface shapes 132, 137 are formed on both surfaces thereof.

In the mold structure 150E, the lower mold 120B on which the concave/convex surface shape 122 is formed contacts the resin composition 84B on the second side (lower surface side) of the substrate 81 of the second workpiece 85F, the upper mold 125A on which the concave/convex surface shape 127 is formed contacts the resin composition 84A on the first side (upper surface side) of the substrate 81 of the first workpiece 85E, and the middle mold 130B is interposed between the first workpiece 85E and the second workpiece 85F, the upper mold surface 131B on which the upper concave/convex surface shape 132 of the middle mold 130B is formed contacts the second side (lower surface side) of the substrate 81 of the first workpiece 85E, and the lower mold surface 136B on which the lower concave/convex surface shape 137 of the middle mold 130B is formed contacts the resin composition 84A on the first side (upper surface side) of the substrate 81 of the second workpiece 85F. Thus, on the one workpiece 85E, the concave/convex shape can be formed on the resin composition 84A on the first side (upper surface side) by the upper mold 125A, and the concave/convex shape can be formed on the resin composition 84B on the second side (lower surface side) by the upper mold surface 131B of the middle mold 130B, and on the second workpiece 85F, the concave/convex shape can be formed on the resin composition 84B on the other side (lower surface side) of the substrate 81 by the lower mold 120B and the concave/convex shape can be formed on the resin composition 84A on the first side (upper surface side) by the lower mold surface 136B of the middle mold 130B.

According to the mold structure 150D shown in FIG. 14, by interposing the middle mold 130A between different workpieces, a plurality of thin plate-like laminates having different types can be molded. According to the mold structure 150E shown in FIG. 15, by interposing the middle mold 130B between identical workpieces, a plurality of identical thin plate-like laminates can be molded. Thus, by arranging a plurality of workpieces and arranging upper mold, middle mold, and lower mold on both sides of each workpiece, a plurality of thin plate-like laminates of the same type or of different types can be simultaneously molded, whereby work efficiency and production efficiency can be improved. Note that though the middle molds 130A, 130B of the mold structures 150D, 150E are configured so as to have the same mold surface on both sides thereof, a plurality of different thin plate-like laminates can be molded by forming different mold surfaces, for example, one is a smooth mold surface and the other is a mold surface having a concave/convex shape. Furthermore, the number of workpieces to be simultaneously processed is not particularly limited, and is preferably approximately 2 to 3 from the viewpoint of processing accuracy, etc.

EXAMPLES

[Thin Plate-like Laminate Production]

The thin plate-like laminates of Prototype Examples 1 to 3 were produced under the following conditions using workpieces in which carbon-coated stainless steel (SUS316L) was used as the substrate, and a mixture of a polypropylene-based resin, carbon nanotubes (CNT), and graphite was used as the film-like resin composition.

Prototype Example 1

In the setting part of the device for the production of a thin plate-like laminate, the above workpiece was held in a mold and a mold retention structure was created (operation time: approximately 10 seconds), and after heating was performed in the heating part at a heating temperature of 200° C. for a heating time of 120 seconds, and thermocompression-bonding was performed in the pressurization part with compression rollers at a pressure of 40 kN, a pressurization time of 20 seconds, and a pressurization temperature of 200° C., the workpiece was slowly cooled to obtain the thin plate-like laminate of Prototype Example 1.

Prototype Example 2

In the setting part of the device for the production of a thin plate-like laminate, the above workpiece was held in a mold and a mold retention structure was created (operation time: approximately 10 seconds), and after heating was performed in the heating part at a heating temperature of 300° C. for a heating time of 30 seconds, and thermocompression-bonding was performed in the pressurization part with compression rollers at a pressure of 40 kN, a pressurization time of 20 seconds, and a pressurization temperature of 200° C., the workpiece was slowly cooled to obtain the thin plate-like laminate of Prototype Example 2.

Prototype Example 3

In the heating part of the device for the production of a thin plate-like laminate, heating was performed on the mold at a heating temperature of 300° C. for a heating time of 30 seconds, in the setting part, the above workpiece was held in the heated mold and the mold retention structure was created (operation time: approximately 10 seconds), and after thermocompression-bonding was performed in the pressurization part with compression rollers at a pressure of 40 kN, a pressurization time of 20 seconds, and a pressurization temperature of 200° C., the workpiece was slowly cooled to obtain the thin plate-like laminate of Prototype Example 3.

Regarding the thin plate-like laminates of Prototype Examples 1 to 3, the quality of the molding state was visually evaluated. The evaluation criteria were "Good" when the molded part (film-like resin layer) was acceptable as a product, and "Excellent" when it was in a superior condition. The results are shown in Table 1.

TABLE 1

|  | Mold at Time of Heating | Heating Temperature (° C.) | Heating Time (sec) | State |
| --- | --- | --- | --- | --- |
| Prototype Example 1 | Workpiece Present | 200 | 120 | Excellent |
| Prototype Example 2 | Workpiece Present | 300 | 30 | Good |
| Prototype Example 3 | Workpiece Absent | 300 | 30 | Excellent |

[Results and Discussion]

In Prototype Example 1, the mold in which the workpiece was held was processed by gently heating it. In Prototype Example 2, the mold in which the workpiece was held was heated at a higher temperature and in a shorter time than in Prototype Example 1 to perform processing. In Prototype Example 3, the mold, which did not hold the workpiece, was heated at a higher temperature and in a shorter time than in Prototype Example 1, and immediately thereafter, the unheated workpiece was held by the heated mold and processing was performed. As a result, as shown in Table 1, the thin plate-like laminate of Prototype Example 2 was able to be molded with a quality that does not cause any problems as a product. Conversely, in the thin plate-like laminates of Prototype Examples 1 and 3, the molded product was in an extremely suitable state as compared with Prototype Example 2.

As can be understood from the comparison of Prototype Example 1 and Prototype Example 2, it was found that when the mold in which the workpiece is held is heated, a higher-quality product can be obtained at a relatively low temperature and with gentle heating than with high-temperature and short time heating. This is because in Prototype Example 2, the workpiece is heated to a higher temperature, together with the mold, as compared with Prototype Example 1, and thus, the film-like resin composition of the workpiece is more easily oxidized than in Prototype Example 1, whereby it is considered that quality is less likely to be improved.

Conversely, in Prototype Example 3, by heating the mold, which did not hold the workpiece, and then holding the workpiece therein, a high-quality product was obtained, as in Prototype Example 1. It is considered that this is because the workpiece was not exposed to a high temperature at the time of heating the mold in Prototype Example 3, and thus, the oxidation of the film-like resin composition of the workpiece was suppressed as compared with Prototype Example 2, which enabled high-quality molding. Furthermore, since in Prototype Example 3, the mold could be heated in a shorter time than in Prototype Example 1, operation time can be shortened as compared with Prototype Example 1.

As exemplified and described above, since the device for the production of a thin plate-like laminate having a film-like resin layer of the present invention comprises a setting device which creates a mold retention structure in which molds are arranged on both surface sides of a workpiece, a heating device which heats the molds to a thermal deformation temperature of a film-like resin composition, a compression roller device in which the mold retention structure, after heating of the molds, is introduced between two compression rollers and which compresses the outer surfaces of the molds by rotating the compression rollers to integrally thermocompression-bond the film-like resin composition and the substrate to form a thin plate-like laminate having a film-like resin layer, and an extraction device which extracts the molds from the mold retention structure after compression, pressure is applied uniformly to the molds to suppress the occurrence of pressure unevenness, and the concave/convex shape can be formed on the film-like resin layer laminated on the thin plate-like substrate with high accuracy and stability. In particular, a fine concave/convex shape can be accurately and stably formed one the film-like resin layer laminated on the thin plate-like substrate.

Note that the device for the production of a thin plate-like laminate having a film-like resin layer of the present invention is not limited to only the Examples described above, and a portion of the structure can be appropriately modified without departing from the spirit of the invention. For example, the array combination of the setting part, the heating part, the pressurization part, and the extraction part is not limited to only the Examples described above, but it can be appropriately configured in accordance with the application, the installation location, etc.

Furthermore, though the setting part, the heating part, the pressurization part, and the extraction part are connected in series by the rail part provided on the machine base, and the mold retention structure is configured so as to be capable of moving on the rail part in the Examples described above, a rail part may not be provided and the mold retention structure may be moved by means of a known transfer device or the like.

Further, regarding the step of creating the mold retention structure in the setting part and the heating part, though a step in which the mold is heated to the thermal deformation temperature of the film-like resin composition after the creation of the mold retention structure in which the mold in which the workpiece is held is arranged or a step in which the mold in which the workpiece is not held is heated to the thermal deformation temperature of the film-like resin composition, the workpiece is then held in the heated mold and the mold retention structure is created was adopted in the Examples described above, this step is not limited thereto. For example, a step in which the mold retention structure is created after the mold, which is not retained in the retention body and in which the workpiece is held, is heated, a step in which the mold, which is not retained in the retention body and which does not hold the workpiece, is heated, and the workpiece is then held in the mold to create the mold creation structure, etc., can be performed by an appropriate procedure as long as it is a step in which the mold retention structure in which the heated mold in which the workpiece is held is arranged is ultimately created in the setting part and the heating part.

INDUSTRIAL APPLICABILITY

The device for the production of a thin plate-like laminate of the present invention can uniformly pressurize the molds to form a concave/convex shape stably in high accuracy on the film-like resin layer laminated on the thin plate-like substrate. Thus, it is a promising alternative to conventional thin plate-like laminate production devices.

REFERENCE SIGNS LIST 10, 10A to 10H thin plate-like laminate production device
11 machine base
12 machine base leg
20 rail part
21 rail body
30 setting part
31 setting device
40 heating part
41 heating device
42 upper hot plate
43 lower hot plate
50 pressurization part
51 compression roller device
52 lower compression roller
53 lower rotational drive device
54 upper compression roller
55 upper rotational drive device
56 pressurization part lifting means
57 rod part of pressurization part lifting means
60 extraction part
61 extraction device
70 cooling part
71 cooling device
72 upper cooling plate
73 lower cooling plate
80 thin plate-like laminate
81 thin plate-like substrate
82 film-like resin layer
83 film-like resin layer concave/convex shape
84, 84A, 84B film-like resin composition
85, 85A, 85B, 85C, 85D, 85E, 85F workpiece
86 workpiece edge position
100, 100A, 100B, 100C mold retention structure
101 retention body
102 side edge
103 edge part
104 lower opening
105 mold retention part
110, 110A, 110B, 110C mold
111 heated mold
112A, 112B, 112C, 112D mold
115 interleaving paper
120, 120A, 120B lower mold
121, 121A, 121B mold surface of lower mold
122 lower mold concave/convex surface shape
123 mating protrusion
125, 125A upper mold
126, 126A mold surface of upper mold
127 upper mold concave/convex surface shape
128 mating hole
130A, 130B middle mold
131A, 131B middle mold upper mold surface
132 middle mold upper concave/convex surface shape
136A, 136B middle mold lower mold surface
137 middle mold lower concave/convex surface shape
150A, 105B, 150C, 150D, 150E mold structure
H concave/convex groove depth
P1 contact position between lower compression roller and mold
P2 contact position between upper compression roller and mold
W1 concave/convex groove top surface width
W2 concave/convex groove inner surface width

The invention claimed is:

1. A device for a production of a thin plate laminate having a film resin layer, the device being for interposing a workpiece in which a film resin composition is laminated on at least one surface of a thin plate substrate with molds to obtain the plate laminate in which the film resin layer is integrally formed on the substrate, the device comprising:
a setting device for creating a mold retention structure in which the molds are arranged on both surface sides of the workpiece, wherein the mold retention structure is slidably arranged on a rail body, and the rail body extends in a conveyance direction of the mold retention structure such that the mold retention structure is conveyed in the conveyance direction,
a heating device for heating the molds to a thermal deformation temperature of the film resin composition,
a compression roller device that has two compression rollers, in which the mold retention structure, after heating of the molds, is introduced between the two compression rollers by moving along the rail body and which compresses outer surfaces of the molds by rotating the compression rollers to integrally thermo-compression-bond the film resin composition and the substrate to form the thin plate laminate having the film resin layer, and
an extraction device for extracting the molds from the mold retention structure after compression, wherein
the setting device, the heating device, the compression roller device, and the extraction device are arranged along the rail body such that the mold retention structure is conveyed in the conveyance direction,
each of the two compression rollers has a rolling axis around which the compression roller rotates, and the rolling axes are arranged parallel to one another, and each of the two rolling axes is arranged perpendicular to the conveyance direction,
the compression roller device is provided with
a drive control device that is configured to drive each of the two compression rollers synchronously wherein the two compression rollers reciprocate the mold retention structure back and forth in the conveyance direction between two edges of the workpiece, which is interposed inside the molds, while the mold retention structure is compressed in the compression roller device, and a pressurization part lifting means that is connected to at least one of the two compression rollers, which is referred to as a connected roller, to raise and lower the connected roller such that the connected roller moves between a pressure position for pressuring the mold retention structure and a releasing position for not contacting the mold retention structure, when the mold retention structure is introduced into the compression roller device, the connected roller is configured to be at the releasing position, and then to be lowered to contact the mold retention structure such that the mold retention structure is sandwiched between the connected roller and a fixed roller, which is the other of the two compression rollers not being connected to the pressurization part lifting means.

2. The device for the production of the plate laminate having the film resin layer according to claim 1, wherein the heating device heats the molds, which are holding the workpiece.

3. The device for the production of the thin plate laminate having the film resin layer according to claim 1, wherein the heating device heats the molds, which are not holding the workpiece.

4. The device for the production of the thin plate laminate having the film resin layer according to claim 2, further comprising
a cooling device which cools the molds compressed by the compression roller device.

5. The device for the production of the thin plate laminate having the film resin layer according to claim 4, wherein the setting device and the extraction device are shared.

6. The device for the production of the thin plate laminate having the film resin layer according to claim 5, wherein the substrate is a thin plate material having a thickness of 1 mm or less and a thickness of the film resin composition is 500 μm or less.

7. The device for the production of the thin plate laminate having the film resin layer according to claim 6, wherein the substrate has two surfaces that are the one surface on which the film resin composition is laminated and the other surface,
the thin plate laminate further includes another film resin composition, and
the another film resin composition is laminated on the other surface of the substrate.

8. The device for the production of a thin plate laminate having a film resin layer according to claim 7, wherein another workpiece identical to the workpiece is arranged and forms an assembly,
the assembly has an upper surface side and a lower surface side, and
the molds are arranged on the upper and lower surface sides of the assembly.

9. The device for the production of a thin plate laminate having the film resin layer according to claim 8, wherein
each of the film resin compositions is a decorative, adhesive, or conductive functional resin composition.

10. The device for the production of the thin plate laminate having the film resin layer according to claim 9, wherein
mold surfaces of the molds have fine concave/convex surface shapes.

11. The device for the production of the thin plate laminate having the film resin layer according to claim 1, wherein
the rail body is a linear structure along which the setting device, the heating device, the compression roller device, and the extraction device are placed in this order such that the mold retention structure is slidable between the setting device and the extraction device, passing through the heating device and the compression roller device.

12. The device for the production of the thin plate laminate having the film resin layer according to claim 1,
the molds are longer than the workpiece with respect to the conveyance direction such that the both edges of the workpiece with respect to the conveyance direction is placed inside the molds when the workpiece is arranged in the molds.

13. The device for the production of the thin plate laminate having the film resin layer according to claim 8,
the molds are longer than the workpiece with respect to the conveyance direction such that the both edges of the workpiece with respect to the conveyance direction is placed inside the molds when the workpiece is arranged in the molds.

14. The device for the production of the thin plate laminate having the film resin layer according to claim 1, wherein
the pressurization part lifting means is provided with a pressure cylinder that is configured to raise and lower the connected roller such that the connected roller keeps applying a constant pressure to the mold retention structure while the mold retention structure is sandwiched between the connected roller and the fixed roller.

15. The device for the production of the thin plate laminate having the film resin layer according to claim 1, wherein
after the compression roller device finishes reciprocating the mold retention structure, the connected roller is configured to be raised toward the releasing position.

* * * * *